(12) United States Patent
Dimou et al.

(10) Patent No.: US 8,913,530 B2
(45) Date of Patent: Dec. 16, 2014

(54) DYNAMIC BAND SELECTION FOR INTERFERENCE MINIMIZATION IN DIRECT DEVICE TO DEVICE COMMUNICATIONS

(75) Inventors: Konstantinos Dimou, Stockholm (SE); Francisco Rodrigo P. Cavalcanti, Fortaleza (BR); Gabor Fodor, Hasselby (SE); Tarcísio Maciel, Fortaleza (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 8 days.

(21) Appl. No.: 13/465,303

(22) Filed: May 7, 2012

(65) Prior Publication Data

US 2013/0294296 A1 Nov. 7, 2013

(51) Int. Cl.
*H04J 3/00* (2006.01)
*H04W 72/08* (2009.01)

(52) U.S. Cl.
CPC .................................. *H04W 72/08* (2013.01)
USPC ......................................... 370/280; 370/294

(58) Field of Classification Search
None
See application file for complete search history.

(56) References Cited

U.S. PATENT DOCUMENTS

| | | | |
|---|---|---|---|
| 2004/0048609 A1* | 3/2004 | Kosaka | 455/422.1 |
| 2007/0211677 A1* | 9/2007 | Laroia et al. | 370/338 |
| 2008/0310329 A1 | 12/2008 | Sun et al. | |
| 2009/0010185 A1 | 1/2009 | Li et al. | |
| 2009/0016229 A1 | 1/2009 | Wu et al. | |
| 2009/0016261 A1 | 1/2009 | Laroia et al. | |
| 2009/0016363 A1 | 1/2009 | Laroia et al. | |
| 2009/0017843 A1 | 1/2009 | Laroia et al. | |
| 2009/0034447 A1 | 2/2009 | Yu et al. | |
| 2010/0093364 A1 | 4/2010 | Ribeiro et al. | |
| 2011/0063995 A1* | 3/2011 | Chen et al. | 370/254 |
| 2011/0223953 A1 | 9/2011 | Lee et al. | |
| 2011/0228666 A1 | 9/2011 | Barbieri et al. | |
| 2012/0020213 A1* | 1/2012 | Horneman et al. | 370/231 |
| 2012/0044815 A1 | 2/2012 | Geirhofer et al. | |
| 2012/0202542 A1 | 8/2012 | Dimou et al. | |

FOREIGN PATENT DOCUMENTS

| | | |
|---|---|---|
| EP | 2012443 A2 | 1/2009 |
| WO | 2011088619 A1 | 7/2011 |
| WO | 2011116815 A1 | 9/2011 |
| WO | 2011123799 A1 | 10/2011 |
| WO | 2012015698 A1 | 2/2012 |

OTHER PUBLICATIONS

Li, Yu et al., "Adaptive TDD UL/DL Slot Utilization for Cellular Controlled D2D Communications," 2011 IEEE Global Mobile Congress, Oct. 17, 2011, pp. 1-6.

(Continued)

*Primary Examiner* — Jeffrey M Rutkowski
*Assistant Examiner* — Hardikkumar Patel
(74) *Attorney, Agent, or Firm* — Withrow & Terranova, PLLC

(57) ABSTRACT

Systems and methods are disclosed for selecting resources for direct device to device (D2D) communications in a cellular communication network. Preferably, resources for the direct D2D communications are selected to minimize, or at least substantially reduce, interference that results from the direct D2D communications in the cellular communication network. In general, either an uplink resource or a downlink resource of the cellular communication network is selected for a direct D2D communication link between a first wireless device and a second wireless device in order to minimize, or at least substantially reduce, interference caused to a third wireless device that uses the same uplink and downlink resources in the same and/or a neighboring cell of the cellular communication network.

31 Claims, 17 Drawing Sheets

(56) References Cited

OTHER PUBLICATIONS

Yu, Chia-Hao et al., "On the Performance of Device-to-Device Underlay Communication with Simple Power Control," 2009 IEEE 69th Vehicular Technology Conference, Apr. 26-29, 2009, pp. 1-5, Barcelona, Spain.
International Search Report and Written Opinion for PCT/IB2013/052220, mailed Sep. 5, 2013, 15 pages.
Doppler, K. et al., "Mode Selection for Device-to-Device Communication Underlaying an LTE-Advanced Network," IEEE Wireless Communications and Networking Conference, Sydney, Australia, Apr. 2010, 6 pages.
Doppler, K. et al.,"Device-to-Device Communication as an Underlay to LTE-Advanced Networks," IEEE Communications Magazine, vol. 47, No. 12, Dec. 2009, pp. 42-49.
Corson, M.S. et al., "Towards Proximity-Aware Internetworking," IEEE Wireless Communications, Dec. 2010, pp. 26-33.
Peng, T. et al., "Interference Avoidance Mechanisms in the Hybrid Cellular and Device-2-Device Systems," 2009 IEEE 20th International Symposium on Personal, Indoor and Mobile Radio Communications, Sep. 2009, pp. 617-621.
Yu, C.H. et al., "Power Optimization of Device-to-Device Communication Underlaying Cellular Communication," IEEE International Conference on Communications, ICC, Dresden, Germany, Jun. 2009, 5 pages.
International Search Report and Written Opinion for PCT/IB2013/053631, mailed Nov. 22, 2013, 12 pages.
International Search Report and Written Opinion for PCT/IB2013/056741, mailed Jan. 16, 2014, 12 pages.
International Search Report and Written Opinion for PCT/IB2013/054965 mailed Feb. 7, 2014, 10 pages.
Notice of Allowance for U.S. Appl. No. 13/425,836, mailed Aug. 22, 2014, 9 pages.
Notice of Allowance for U.S. Appl. No. 13/525,752, mailed Aug. 12, 2014, 9 pages.

* cited by examiner

US 8,913,530 B2

DYNAMIC BAND SELECTION FOR INTERFERENCE MINIMIZATION IN DIRECT DEVICE TO DEVICE COMMUNICATIONS

FIELD OF THE DISCLOSURE

The present disclosure relates to direct device to device communications in a cellular communication network and more particularly relates to minimizing interference resulting from direct device to device communications in a cellular communication network.

BACKGROUND

Network-assisted direct device to device (D2D) communication is expected to be a key feature supported by next generation cellular communication networks. FIG. 1 illustrates a cellular communication network 10 that enables direct D2D communications. As illustrated, the cellular communication network 10 includes a base station (BS) 12 that serves a corresponding cell 14 of the cellular communication network 10. While only one base station 12 is illustrated, the cellular communication network 10 includes numerous base stations 12 serving corresponding cells 14. In this example, wireless devices (WDs) 16, 18, and 20 are located within the cell 14. The wireless devices 16 and 18 are in proximity to one another. As such, when the wireless devices 16 and 18 desire to establish a bearer link, rather than establishing the bearer link through the base station 12, the cellular communication network 10 assists the wireless devices 16 and 18 to establish a direct D2D communication link (i.e., a direct D2D bearer link) between one another. More specifically, through signaling with the base station 12 or some other mechanism, the wireless devices 16 and 18 discover one another using a D2D device discovery process and then establish a D2D communication link directly between one another rather than through the base station 12.

Direct D2D communication is possible regardless of whether the cellular communication network 10 is Frequency Division Duplex (FDD) (i.e., uses different uplink and downlink frequency bands) or Time Division Duplex (TDD) (i.e., using the same frequency band but different time slots for uplink and downlink). However, it is commonly accepted that a direct D2D communication link, such as that established between the wireless devices 16 and 18, is preferably a TDD communication link where transmissions by one wireless device use the same resources as reception by the other wireless device. These "resources" are physical frequency and/or time resources depending on the particular implementation of the cellular communication network 10. TDD (i.e., half duplex operation) is preferred because operating a transmitter and receiver in the same frequency band in a half duplex fashion is easier to implement than a full duplex FDD implementation.

In order to provide spectral efficiency, it is preferable for the D2D communication link to use the same resources as those used by the cellular communication network 10, in which case the cellular communication network 10 performs actions such as mode selection, network-controlled scheduling, and power control. In this example, the D2D communication link uses either an uplink resource or a downlink resource of the cellular communication network 10 that is also assigned to the wireless device 20. While using the same resources as the cellular communication network 10 provides spectral efficiency, doing so also gives rise to new intra-cell and inter-cell interference situations. For example, due to the presence of D2D communication links and the sharing of resources, intra-cell orthogonality is no longer maintained.

Specifically, FIG. 2 illustrates both intra-cell and inter-cell interference caused by transmissions between the wireless devices 16 and 18 over the D2D communication link when using a downlink (DL) resource of the cellular communication network 10. The transmissions between the wireless devices 16 and 18 over the D2D communication link using the DL resource cause strong intra-cell interference to the wireless device 20 located within the cell 14 that uses the same DL resource. In addition, the transmissions between the wireless devices 16 and 18 over the D2D communication link using the DL resource cause strong interference to wireless devices that use the same DL resource in neighboring cells. For example, the transmissions between the wireless devices 16 and 18 over the D2D communication link using the DL resource cause strong interference to a wireless device 22 located in a neighboring cell 24 served by a neighboring base station 26. In addition, while not illustrated, transmissions between the wireless devices 16 and 18 over the D2D communication link using the DL resource may cause interference to other wireless devices in the cell 14 and/or in neighboring cells such as the neighboring cell 24.

FIG. 3 illustrates both intra-cell and inter-cell interference when the D2D communication link between the wireless devices 16 and 18 uses an uplink (UL) resource of the cellular communication network 10. As illustrated, when the wireless device 16 transmits to the wireless device 18 over the D2D communication link using the UL resource, uplink transmissions by the wireless device 20 using the same UL resource cause strong intra-cell interference to the wireless device 18 when receiving the transmissions from the wireless device 16 over the D2D communication link. Similarly, uplink transmissions from the wireless device 22 to the neighboring base station 26 in the neighboring cell 24 using the same UL resource cause strong inter-cell interference to the wireless device 18 when receiving the transmissions from the wireless device 16 over the D2D communication link. In addition, while not illustrated, transmissions between the wireless devices 16 and 18 over the D2D communication link using the DL resource may cause interference to the uplinks from other wireless devices to the base station 12 in the cell 14 and/or base stations in neighboring cells such as the neighboring base station 26 in the neighboring cell 24.

Thus, D2D communication using the same resources used for downlinks and uplinks in the cellular communication network 10 results in new interference scenarios not envisioned in conventional cellular communication networks. As such, there is a need for systems and methods for minimizing, or at least substantially reducing, interference resulting from D2D communication in a cellular communication network.

SUMMARY

Systems and methods are disclosed for selecting resources for direct device to device (D2D) communications in a cellular communication network. Preferably, resources for the direct D2D communications are selected to minimize, or at least substantially reduce, interference that results from the direct D2D communications in the cellular communication network. In general, either an uplink resource or a downlink resource of the cellular communication network is selected for a direct D2D communication link between a first wireless device and a second wireless device in order to minimize, or at least substantially reduce, interference caused to a third wireless device that uses the same uplink and downlink resources in the same and/or a neighboring cell of the cellular communication network.

In one embodiment, either an uplink (UL) resource or a downlink (DL) resource of the cellular communication network is selected for a direct D2D communication link between a first wireless device and a second wireless device based on a link quality metric that represents a link quality between the first and second wireless devices for the DL resource, a link quality metric that represents a link quality between the first and second wireless devices for the UL resource, and a link quality metric that represents a link quality between a third wireless device and a base station that serves the third wireless device for the DL resource while the first wireless device is transmitting to the second wireless device on the DL resource. In one particular embodiment, the DL resource is selected as a resource for the direct D2D communication link if the link quality between the first and second wireless devices for the DL resource is greater than the link quality between the first and second wireless devices for the UL resource and the link quality between the third wireless device and the base station that serves the third wireless device for the DL resource while the first wireless device is transmitting to the second wireless device using the DL resource is greater than a predefined threshold quality level. Otherwise, the UL resource is selected as the resource for the direct D2D communication link between the first and second wireless devices.

In one particular embodiment, the first and second wireless devices are located in a first cell in the cellular communication network, and the third wireless device is a wireless device that utilizes the UL and DL resources in a second cell that neighbors the first cell in the cellular communication network. In another particular embodiment, the first, the second, and the third wireless devices are located in the same cell in the cellular communication network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 14:
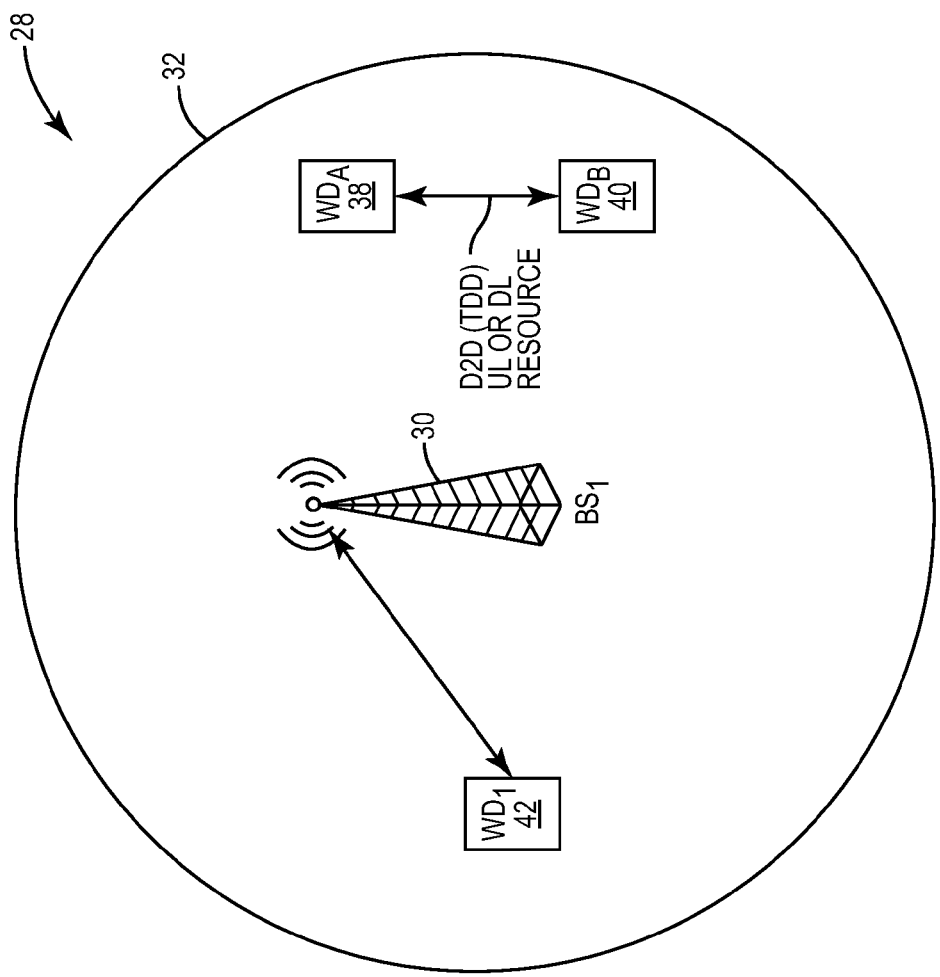
Figure 15:
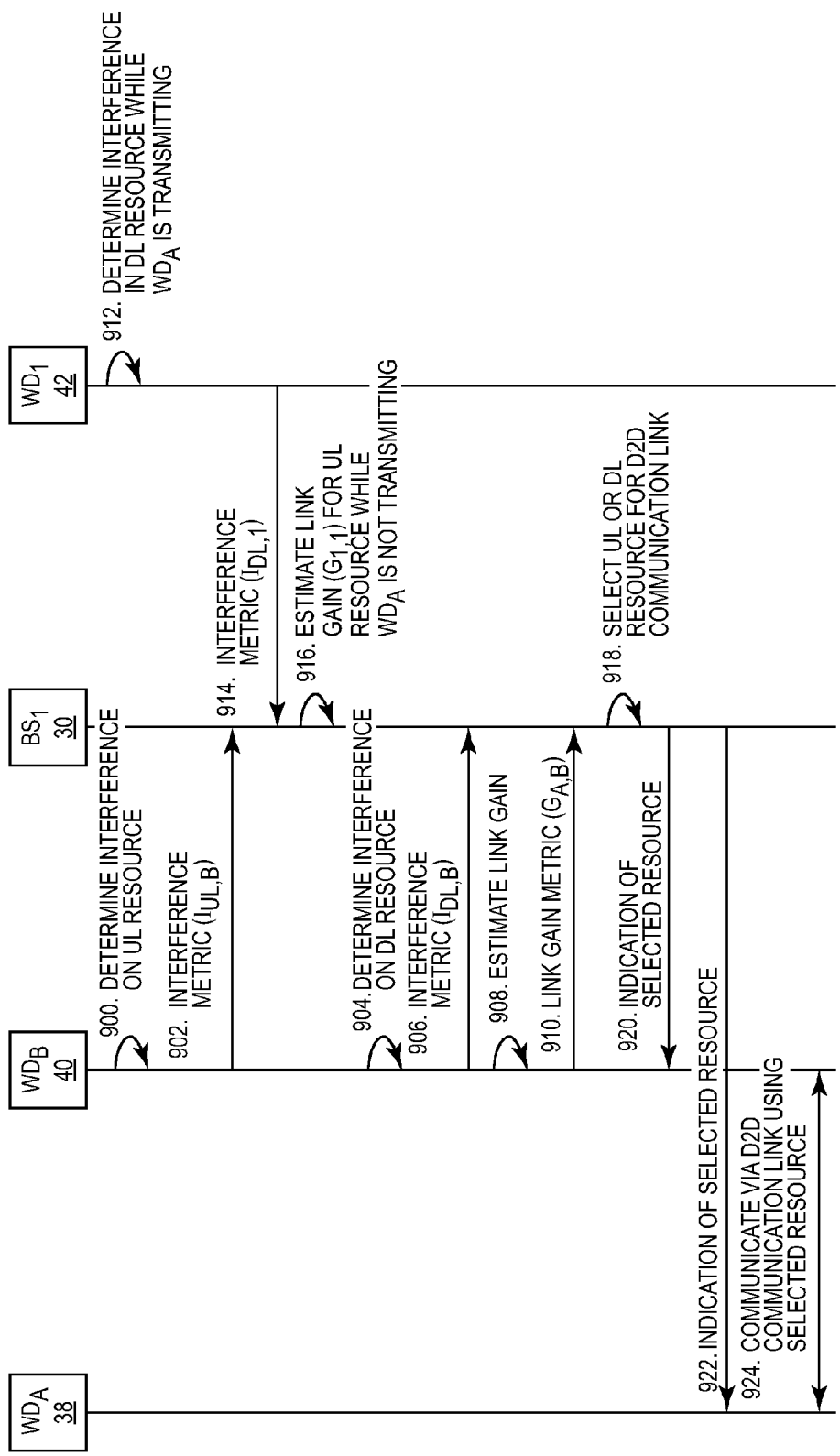
Figure 17:
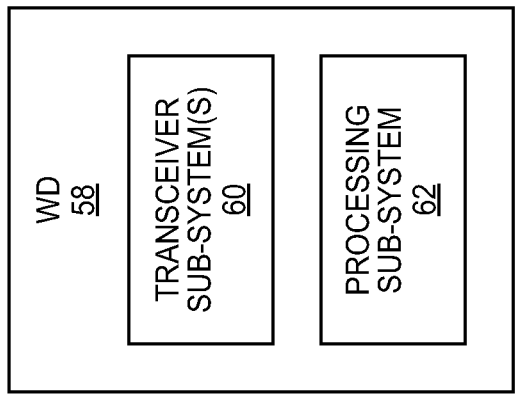
Figure 16:
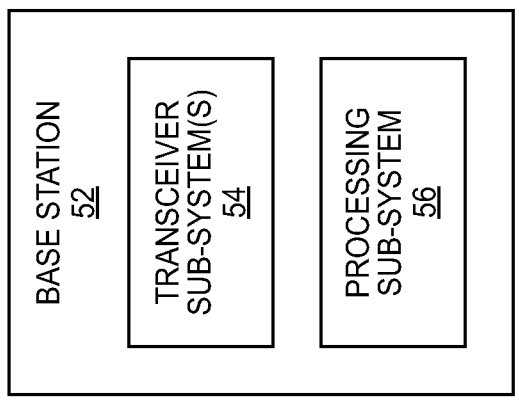

FIG. 14 illustrates the cellular communication network where a UL or DL resource of the cellular communication network is selected for a direct D2D communication link in such a manner as to minimize, or at least substantially reduce, intra-cell interference according to one embodiment of the present disclosure; and FIG. 15 illustrates the operation of the cellular communication network of FIG. 14 according to one embodiment of the present disclosure;

FIG. 16 is a block diagram of a base station according to one embodiment of the present disclosure; and FIG. 17 is a block diagram of a wireless device according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for selecting resources for direct device to device (D2D) communications in a cellular communication network. Preferably, resources for the direct D2D communications are selected to minimize, or at least substantially reduce, interference that results from the direct D2D communications in the cellular communication network. In general, either an uplink (UL) resource or a downlink (DL) resource of the cellular communication network is selected for a direct D2D communication link between a first wireless device and a second wireless device in order to minimize, or at least substantially reduce, interference caused to a third wireless device that uses the same UL and DL resources in the same and/or a neighboring cell of the cellular communication network.

Figure 1:
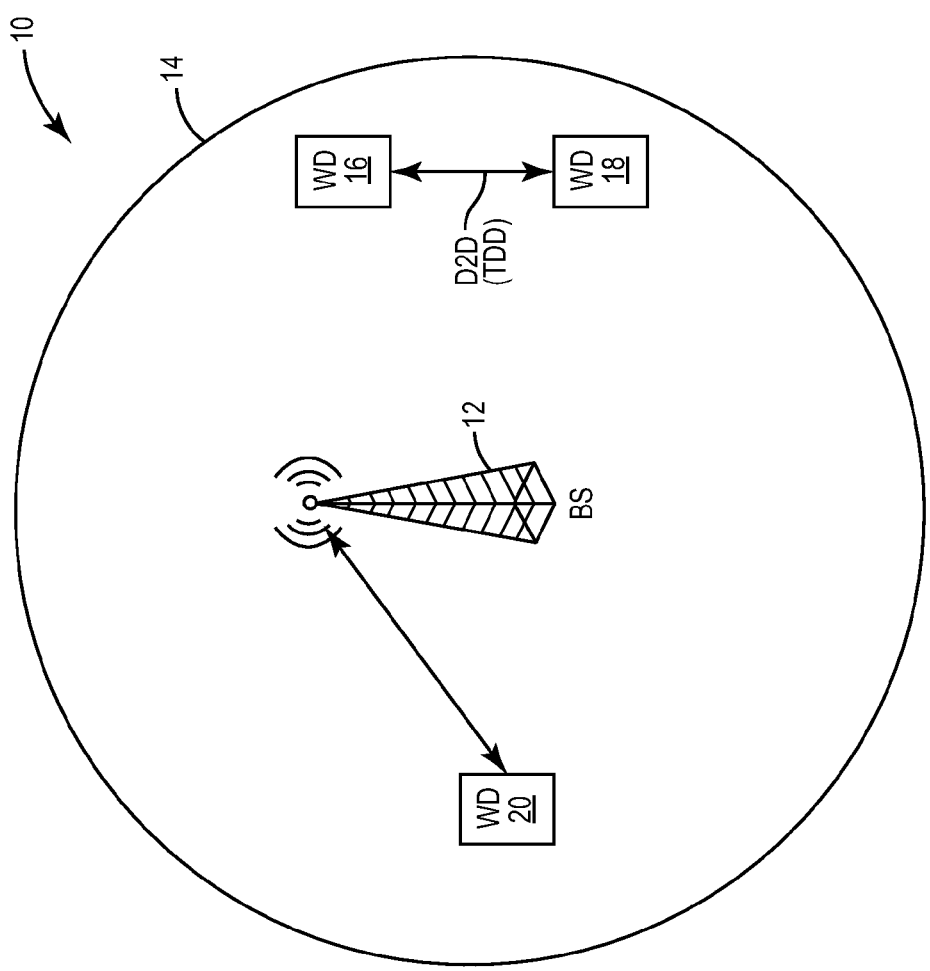
FIG. 1 illustrates a direct device-to-device (D2D) communication link in a cellular communication network.
Figure 2:
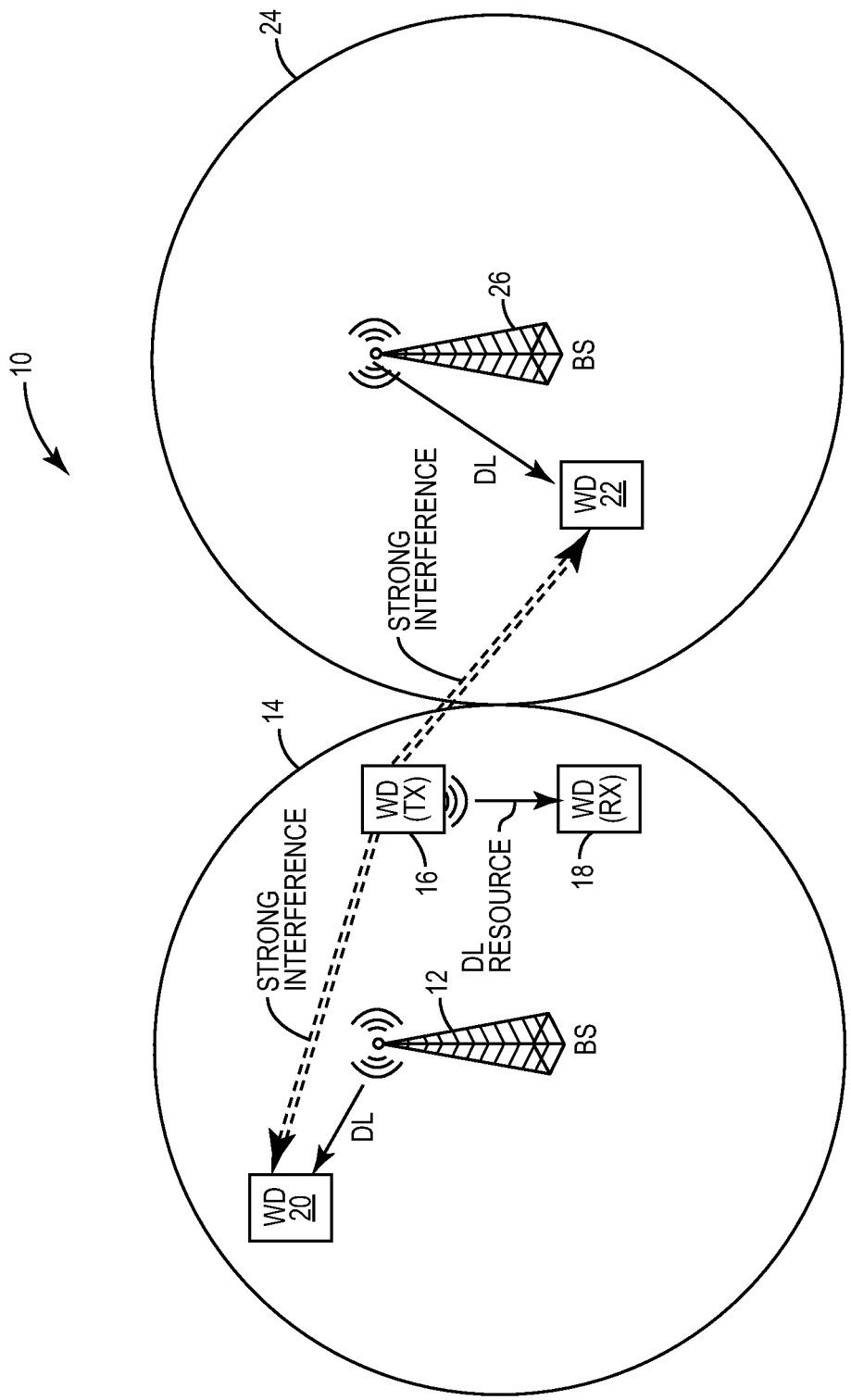
FIG. 2 illustrates a direct D2D communication link in a cellular communication network, where the direct D2D communication link utilizes a downlink (DL) resource of the cellular communication network and causes strong interference in a downlink to a wireless device in a neighboring cell that uses the same DL resource.
Figure 3:
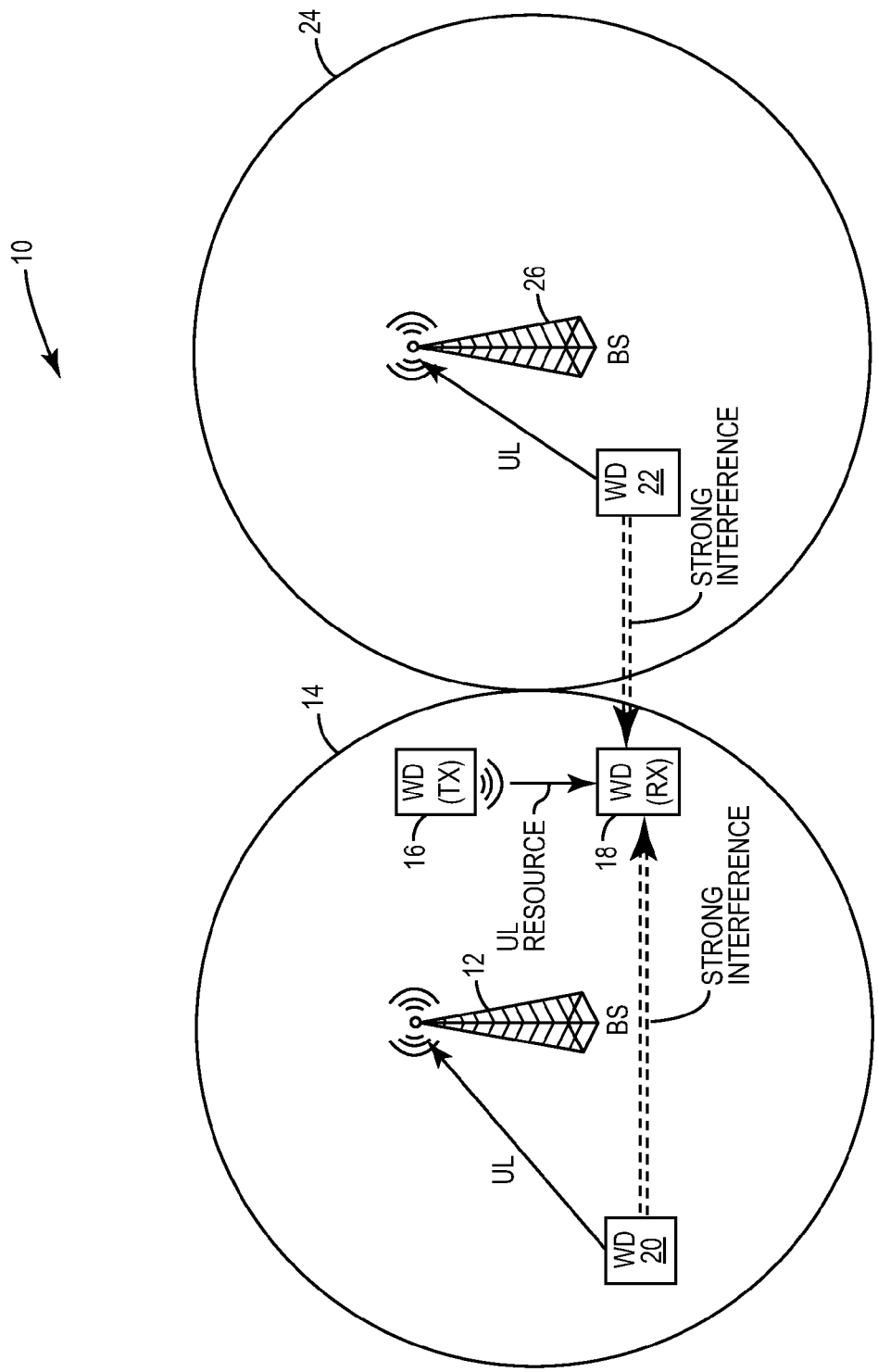
FIG. 3 illustrates a direct D2D communication link in a cellular communication network, where the direct D2D communication link utilizes an uplink (UL) resource of the cellular communication network and an uplink from a wireless device in a neighboring cell that uses the same UL resource causes strong interference to the direct D2D communication link.
Figure 4:
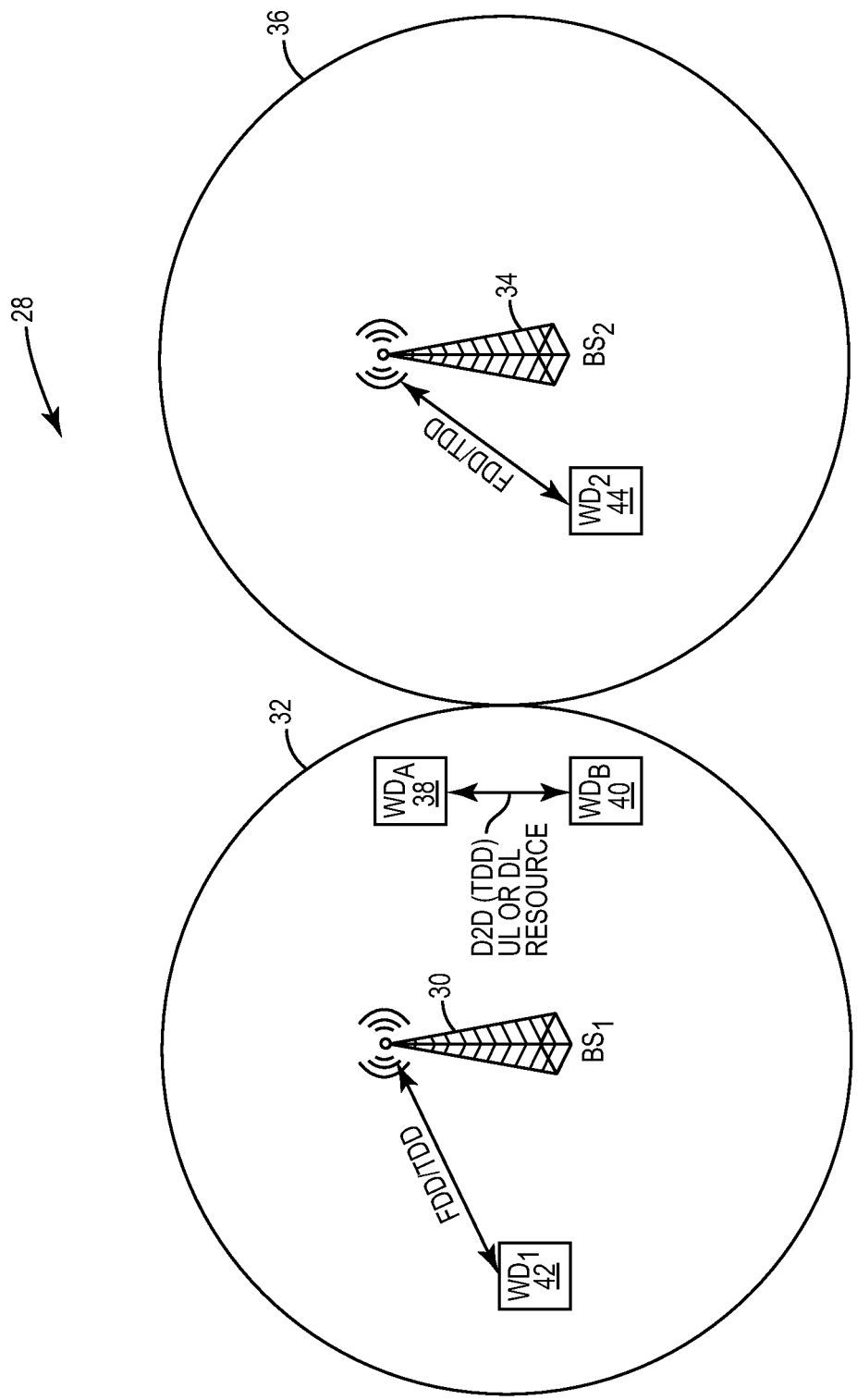
FIG. 4 illustrates a cellular communication network where a UL or DL resource of the cellular communication network is selected for a direct D2D communication link in such a manner as to minimize, or at least substantially reduce, inter-cell interference according to one embodiment of the present disclosure.

FIG. 4 illustrates a cellular communication network 28 where a UL or DL resource of the cellular communication network 28 is selected for a direct D2D communication link in such a manner as to minimize, or at least substantially reduce, inter-cell interference according to one embodiment of the present disclosure. As illustrated in FIG. 4, the cellular communication network 28 includes a base station 30 ($BS_1$) that serves a corresponding cell 32 of the cellular communication network 28. In addition, the cellular communication network 28 includes a base station 34 ($BS_2$) that serves a corresponding cell 36 of the cellular communication network 28. The cells 32 and 36 neighbor one another in the cellular communication network 28. As such, the cell 36 is also referred to herein as a neighboring cell 36 of the cell 32, and the base station 34 is also referred to herein as a neighboring base station 34 of the base station 30. In one particular non-limiting embodiment, the base stations 30 and 34 are eNodeBs (eNBs) in a Long Term Evolution (LTE) cellular communication network. However, the base stations 30 and 34 are not limited thereto.

In this example, wireless devices (WDs) 38 and 40 ($WD_A$ and $WD_B$) are located within the cell 32 and are in close proximity to one another. As used herein, two wireless devices are "in close proximity to one another" when the two wireless devices are sufficiently close to form a direct D2D communication link. When the wireless devices 38 and 40 desire to establish a bearer link, rather than establishing the bearer link through the base station 30, the cellular communication network 28 assists the wireless devices 38 and 40 to establish a direct D2D communication link (i.e., a direct D2D bearer link) between one another. More specifically, through signaling with the base station 30 or some other mechanism, the wireless devices 38 and 40 discover one another using a D2D device discovery process and then establish a D2D communication link directly between one another rather than through the base station 30.

The D2D communication link between the wireless devices 38 and 40 is a Time Division Duplex (TDD), or half-duplex, communication link that utilizes either a UL resource or a DL resource of the cellular communication network 28. In order to provide spectral efficiency, the same UL and DL resources are also used by a wireless device 42 ($WD_1$) located in the cell 32 and a wireless device 44 ($WD_2$) located in the neighboring cell 36. As used herein, a UL resource is a physical resource utilized by the cellular communication network 28 for uplinks from wireless devices to base stations (e.g., a physical resource utilized for the uplink from the wireless device 42 to the base station 30). In one particular embodiment, the cellular communication network 28 is a Frequency Division Duplexing (FDD) network that utilizes different frequency bands for uplinks and downlinks, and the UL resource is a physical resource in the uplink frequency band. In another embodiment, the cellular communication network 28 is a TDD network that utilizes the same frequency band but different time slots for uplink and downlink, and the UL resource is an uplink time slot. Similarly, a DL resource is a physical resource utilized by the cellular communication network 28 for downlinks from base stations to wireless devices (e.g., a physical resource utilized for the downlink from the base station 30 to the wireless device 42). In one particular embodiment, the cellular communication network 28 is a FDD network that utilizes different frequency bands for uplink and downlink, and the DL resource is a physical resource in the downlink frequency band. In another embodiment, the cellular communication network 28 is a TDD network that utilizes the same frequency band but different time slots for uplink and downlink, and the DL resource is a downlink time slot.

As discussed below in detail, in one embodiment, the wireless devices 38, 40, and 42 are suitably selected as a triple $<WD_1, WD_A, WD_B>$ such that the direct D2D communication link between the wireless device 38 and the wireless device 40 ($WD_A$ and $WD_B$) share either the UL or DL resource of the wireless device 42 ($WD_1$). The triple may be scheduled by the base station 30 using any suitable technique. Techniques for scheduling a triple are well known in the art and are not repeated herein. The scheduling of the triple may be based on metrics such as, for example, link gain between the wireless devices 38 and 40 and link gain between the wireless device 42 and the base station 30. Then, either the UL resource or the DL resource is selected for the direct D2D communication link in such a manner as to minimize, or at least substantially reduce, inter-cell interference caused to or by the wireless device 44 in the neighboring cell 36 that also utilizes the same UL and DL resources. The selection of the UL resource or the DL resource is made based on a number of metrics that represent: (1) a link quality between the wireless devices 38 and 40 for the DL resource, (2) a link quality between the wireless devices 38 and 40 for the UL resource, and (3) a link quality between the wireless device 44 and the base station 34 for the UL resource during transmission(s) between the wireless devices 38 and 40 using the UL resource. Using these metrics, either the UL or DL resource is selected such that inter-cell interference between the wireless devices 38 and 40 participating in the D2D communication link and the wireless device 44 is minimized, or at least substantially reduced.

Figure 5:
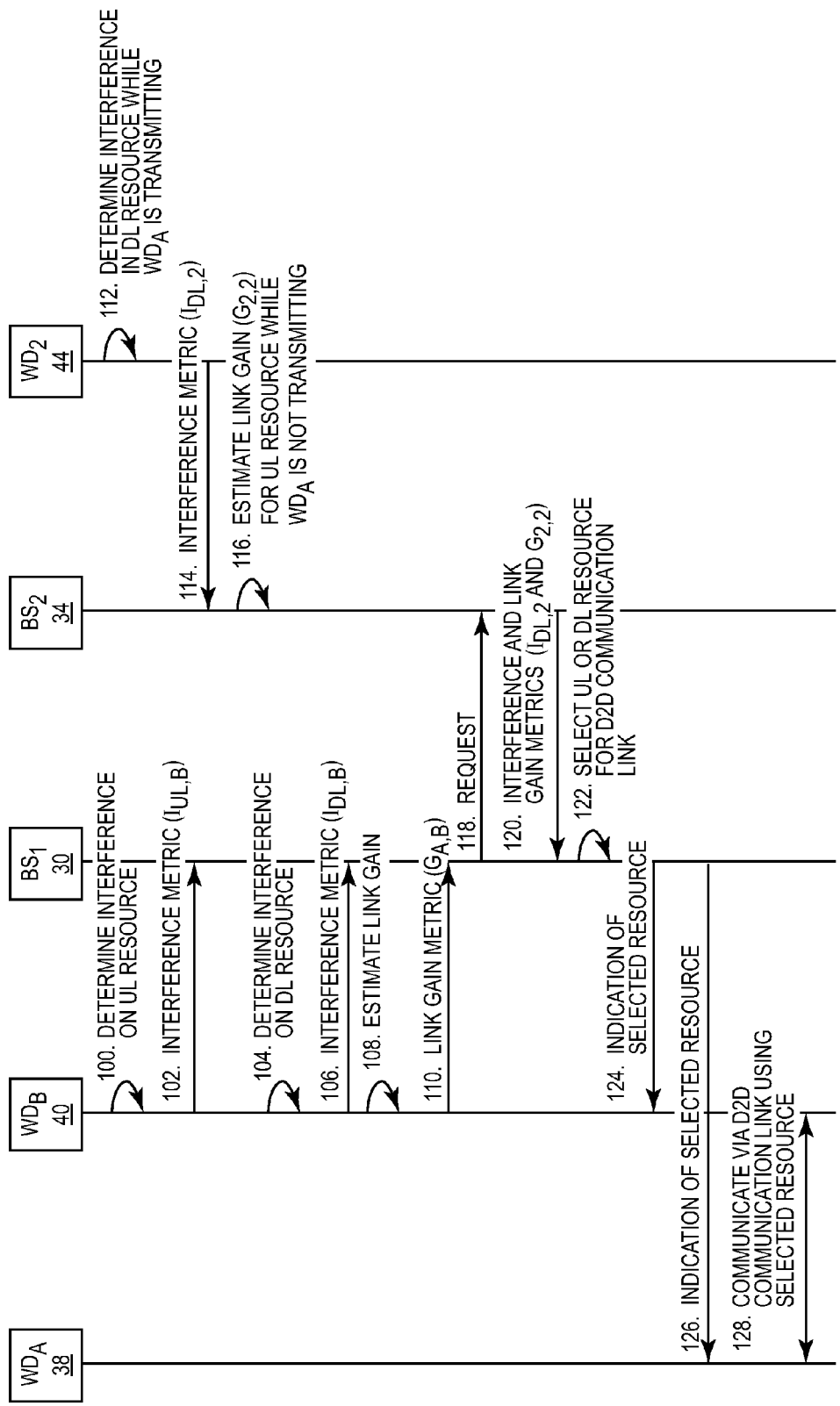
FIG. 5 illustrates the operation of the cellular communication network of FIG. 4 according to one embodiment of the present disclosure.

FIG. 5 illustrates the operation of the cellular communication network 28 of FIG. 4 to select either the UL or the DL resource as the resource for the direct D2D communication link between the wireless devices 38 and 40 according to one embodiment of the present disclosure. Before proceeding, it should be noted that the numerical ordering of steps should not be construed as to limit the ordering of the steps in FIG. 5 or any other such figure included herein. Rather, the steps can be performed in any order unless otherwise indicated herein or required. As illustrated, the wireless device 40 ($WD_B$) determines an amount of interference on the UL resource perceived at the wireless device 40 (step 100), and provides a corresponding interference metric ($I_{UL,B}$) to the base station 30 ($BS_1$) using a conventional cellular communication link between the wireless device 40 and the base station 30 (step 102). Preferably, the interference metric ($I_{UL,B}$) is an average value or, in other words, a metric that represents an average amount of interference on the UL resource perceived at the wireless device 40. Note, however, that in an alternative embodiment the wireless device 40 may report instantaneous interference metric values to the base station 30, where the instantaneous interference metric values are thereafter averaged to provide the interference metric ($I_{UL,B}$). The amount of interference on the UL resource may be measured directly by the wireless device 40 or computed or otherwise obtained using two or more other metrics determined by the wireless device 40.

In addition, the wireless device 40 determines an amount of interference on the DL resource perceived at the wireless device 40 (step 104), and provides a corresponding interference metric ($I_{DL,B}$) to the base station 30 using a conventional cellular communication link between the wireless device 40 and the base station 30 (step 106). Preferably, the interference metric ($I_{DL,B}$) is an average value or, in other words, a metric that represents an average amount of interference on the DL resource perceived at the wireless device 40. Note, however, that in an alternative embodiment the wireless device 40 may report instantaneous interference metric values to the base station 30, where the instantaneous interference metric values are thereafter averaged to provide the interference metric ($I_{DL,B}$). The amount of interference on the DL resource may be measured directly by the wireless device 40 or computed or otherwise obtained using two or more other metrics determined by the wireless device 40.

In addition to interference, the wireless device 40 estimates a link, or path, gain between the wireless devices 38 and 40 (step 108), and provides a corresponding link gain metric ($G_{A,B}$) to the base station 30 using a conventional cellular communication link between the wireless device 40 and the base station 30 (step 110). In order to communicate, the wireless devices 38 and 40 should be able to estimate the link gain between them using conventional techniques. For example, the wireless device 40 can estimate the link gain between the wireless device 38 and the wireless device 40 using a reference signal or beacon transmitted by the wireless device 38. Preferably, the link gain metric ($G_{A,B}$) is an average value or, in other words, a metric that represents an average link gain value between the wireless devices 38 and 40. Note, however, that in an alternative embodiment the wireless device 40 may report instantaneous link gain values to the base station 30, where the instantaneous link gain values are thereafter averaged to provide the link gain metric ($G_{A,B}$). Notably, the interference metrics ($I_{UL,B}$ and $I_{DL,B}$) and the link gain metric ($G_{A,B}$) may be provided to the base station 30 proactively or in response to one or more requests from the base station 30.

Turning now to the neighboring wireless device 44 ($WD_2$), the neighboring wireless device 44 determines an amount of interference on the DL resource perceived at the neighboring wireless device 44 while the wireless device 38 ($WD_A$) is transmitting on the DL resource (step 112), and provides a corresponding interference metric ($I_{DL,2}$) to the neighboring base station 34 ($BS_2$) using a conventional cellular communication link between the neighboring wireless device 44 and the neighboring base station 34 (step 114). Preferably, the interference metric ($I_{DL,2}$) is an average value or, in other words, a metric that represents an average amount of interference on the DL resource perceived at the neighboring wireless device 44 while the wireless device 38 is transmitting on the DL resource. Note, however, that in an alternative embodiment the neighboring wireless device 44 may determine and report instantaneous interference metric values to the neighboring base station 34, where the instantaneous interference metric values are thereafter averaged to provide the interference metric ($I_{DL,2}$). Notably, the interference metric ($I_{DL,2}$) may be provided to the neighboring base station 34 proactively or in response to one or more requests from the neighboring base station 34.

In one particular embodiment, in order to obtain the interference metric ($I_{DL,2}$), the neighboring wireless device 44 detects a reference signal sent by the wireless device 38 using the DL resource and estimates the power of the reference signal. This reference signal could be, for example, structurally similar to the reference signal, or reference symbols, of the neighboring base station 34. Further, the reference signal detected by the neighboring wireless device 44 may be the same signal sent from the wireless device 38 to the wireless device 40 for path gain estimation for the DL resource. The neighboring wireless device 44 then determines the interference metric ($I_{DL,2}$) based on the estimated power of the reference signal from the wireless device 38 (e.g., as if the wireless device 38 were an interfering base station) and total received power received from all network nodes transmitting on the DL resource. Depending on how the total received power is measured, the interference metric ($I_{DL,2}$) may be determined by subtracting received power from the neighboring base station 34 from the total received power from all network nodes transmitting on the DL resource. Alternatively, if the neighboring wireless device 44 is not able to measure the total received power directly but is capable of detecting and estimating the power of individual reference signals, the neighboring wireless device 44 may determine the interference metric ($I_{DL,2}$) by summing the estimated power of the individual reference signals and then subtracting the received power from the neighboring base station 34 from the sum of the estimated power of the individual reference signals. Lastly, it should be noted that for the unlikely case where the power received from the wireless device 38 by the neighboring wireless device 44 on the DL resource is negligible (i.e., the reference signal from the wireless device 38 is too weak), then the interference metric ($I_{DL,2}$) may be set to zero or some other value that represents negligible interference.

In another embodiment, in order for the neighboring wireless device 44 to obtain the interference metric ($I_{DL,2}$), the base stations 30 and 34 provide schedule synchronization or other coordination such that the neighboring wireless device 44 receives information from the base station 34 that indicates one or more times at which the wireless device 38 will be transmitting using the DL resource. Using this information, the neighboring wireless device 44 determines an amount of interference on the DL resource while the wireless device 38 is transmitting. Alternatively, the base stations 30 and 34 may communicate such that the base station 30 obtains information that indicates one or more times at which the wireless device 44 will expect a transmission by the wireless device 38. The base station 30 then schedules a transmission by the wireless device 38 on the DL resource at the time(s) expected by the wireless device 44. The wireless device 44 is then enabled to determine an amount of interference on the DL resource when the wireless device 38 is transmitting on the DL resource.

In addition, the neighboring base station 34 estimates a link gain between the neighboring wireless device 44 and the neighboring base station 34 for the UL resource while the wireless device 38 is not transmitting to the wireless device 40 via the D2D communication link using the UL resource to thereby provide a link gain metric ($G_{2,2}$) (step 116). For example, the neighboring base station 34 can estimate the link gain between the neighboring wireless device 44 and the neighboring base station 34 using a reference signal or beacon transmitted by the neighboring wireless device 44 on the UL resource. Notably, the base station 34 can determine when the wireless device 38 is not transmitting by, for example, trying to detect the reference signal from the wireless device 38 or through a coordination mechanism among the base stations 30 and 34. Preferably, the link gain metric ($G_{2,2}$) is an average value or, in other words, a metric that represents an average link gain value between the neighboring wireless device 44 and the neighboring base station 34 for the UL resource while the wireless device 38 is not transmitting to the wireless device 40 via the D2D communication link using the UL resource. Note, however, that in an alternative embodiment the neighboring base station 34 estimates instantaneous link gain values, where the instantaneous link gain values are thereafter averaged to provide the link gain metric ($G_{2,2}$).

At some point, the base station 30 sends a request to the neighboring base station 34 for the interference metrics ($I_{DL,2}$) values and link gain metrics ($G_{2,2}$) for the neighboring wireless device 44 that uses the DL and UL resources (step 118). The neighboring base station 34 returns the interference metric ($I_{DL,2}$) and link gain metric ($G_{2,2}$) to the base station 30 in response to the request (step 120). Before proceeding, it should be noted that while in this embodiment and other embodiments described herein, the interference metrics $I_{UL,B}$, $I_{DL,B}$, and $I_{DL,2}$ and the link gain metrics $G_{A,B}$ and $G_{2,2}$ are provided to the base station 30, the present disclosure is not limited thereto. Other metrics from which the desired metrics can be computed or otherwise derived may alternatively be reported to the base station 30. For example, received power values could be reported and used to derive the desired link gain metrics given that knowledge about transmit power is available. As another example, several received power values from different sources could be reported and used to derive the desired interference metrics using simple additions and subtractions. Such estimates can be obtained based on system-specific parameters (e.g., Reference Signal Received Power (RSRP), Reference Signal Received Quality (RSRQ), or the like).

The base station 30 then selects either the UL resource or the DL resource as the resource for the D2D communication link between the wireless devices 38 and 40 (step 122). As discussed below in detail, the selection of either the UL resource or the DL resource is based on: (1) a link quality metric for the UL resource between the wireless devices 38 and 40 that represents a link quality between the wireless devices 38 and 40 for the UL resource and is derived based on the interference metric for the UL resource perceived by the wireless device 40 ($I_{UL,B}$) and the link gain between the wireless devices 38 and 40 ($G_{A,B}$), (2) a link quality metric for the DL resource between the wireless devices 38 and 40 that represents a link quality between the wireless devices 38 and 40 for the DL resource and is derived based on the interference metric for the DL resource perceived by the wireless device 40 ($I_{DL,B}$) and the link gain between the wireless devices 38 and 40 ($G_{A,B}$), and (3) a link quality metric for the DL resource between the neighboring wireless device 44 and the neighboring base station 34 that represents a link quality between the neighboring wireless device 44 and the neighboring base station 34 for the DL resource and is derived based on the interference metric for the DL resource perceived by the neighboring wireless device 44 ($I_{DL,2}$), and the link gain between the neighboring wireless device 44 and the neighboring base station 34 ($G_{2,2}$). Once the resource for the D2D communication link is selected, the base station 30 sends an indication of the resource selected for the D2D communication link to the wireless devices 38 and 40 (steps 124 and 126). The wireless devices 38 and 40 then communicate via the D2D communication link using the resource selected for the D2D communication link (step 128). Notably, this process is preferably periodical or otherwise repeated to dynamically select the resource for the D2D communication link.

Figure 6:
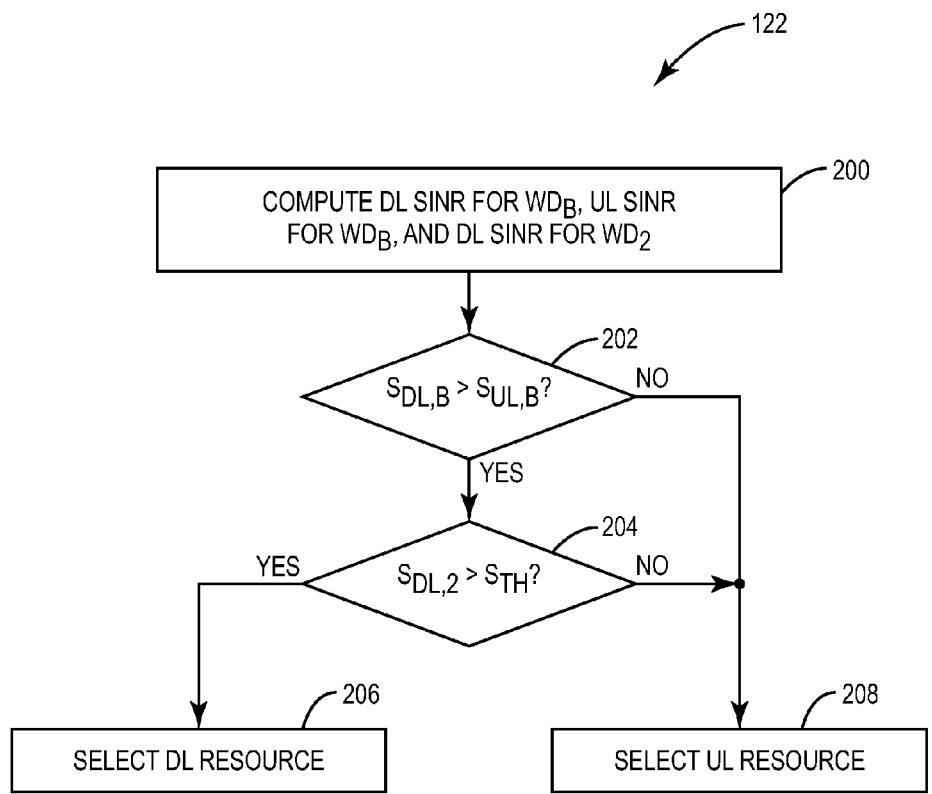
FIG. 6 is a flow chart that illustrates the step of selecting either the UL or DL resource of the cellular communication network for the direct D2D communication link of FIG. 5 in more detail according to one embodiment of the present disclosure.

FIG. 6 is a flow chart that illustrates step 122 of FIG. 5 in more detail according to one embodiment of the present disclosure. First, the base station 30 computes a DL Signal to Interference plus Noise (SINR) for the wireless device 40 ($S_{DL,B}$), a UL SINR for the wireless device 40 ($S_{UL,B}$), and a DL SINR for the neighboring wireless device 44 ($S_{DL,2}$) (step 200). More specifically, the DL SINR for the wireless device 40 ($S_{DL,B}$) can be computed as:

$$S_{DL,B} = \frac{P_{A,B} \times G_{A,B}}{I_{DL,B}},$$

where $P_{A,B}$ is a maximum transmit power used by the wireless device 38 when transmitting to the wireless device 40 via the D2D communication link. Similarly, the UL SINR for the wireless device 40 ($S_{UL,B}$) can be computed as:

$$S_{UL,B} = \frac{P_{A,B} \times G_{A,B}}{I_{UL,B}}.$$

Finally, the DL SINR for the neighboring wireless device 44 ($S_{DL,2}$) can be computed as:

$$S_{DL,2} = \frac{P_{2,2} \times G_{2,2}}{I_{DL,2}},$$

where $P_{2,2}$ is a maximum transmit power used by the neighboring base station 34 when transmitting to the neighboring wireless device 44. Alternatively, $P_{A,B}$ and/or $P_{2,2}$ may be transmit power values actually used by the corresponding device/node when transmitting or may be average transmit power values, which can be made available to the base station 30 in a manner similar to that in which the link gain values are provided to the base station 30. If these values are not available, then the maximum transmit power value(s) may be used as $P_{A,B}$ and $P_{2,2}$. Moreover, if the maximum transmit powers are actually used, the transmit powers may thereafter be reduced using a power control feature.

The DL SINR for the wireless device 40 ($S_{DL,B}$) is referred to herein as a link quality metric that represents a link quality between the wireless devices 38 and 40 for the DL resource. However, the present disclosure is not limited thereto. Other link quality metrics for the DL resource between the wireless devices 38 and 40 may additionally or alternatively be used. Likewise, the UL SINR for wireless device 40 ($S_{UL,B}$) is referred to herein as a link quality metric that represents a link quality between the wireless devices 38 and 40 for the UL resource. However, the present disclosure is not limited thereto. Other link quality metrics for the UL resource between the wireless devices 38 and 40 may additionally or alternatively be used. Lastly, the DL SINR for the neighboring wireless device 44 ($S_{DL,2}$) is referred to herein as a link quality metric that represents a link quality between the neighboring wireless device 44 and the neighboring base station 34 for the DL resource. However, the present disclosure is not limited thereto. Other link quality metrics for the DL resource between the neighboring wireless device 44 and the neighboring base station 34 may additionally or alternatively be used.

Next, the base station 30 determines whether the DL SINR for the wireless device 40 ($S_{DL,B}$) is greater than the UL SINR for the wireless device 40 ($S_{UL,B}$) (step 202). If so, the base station 30 determines whether the DL SINR for the neighboring wireless device 44 ($S_{DL,2}$) is greater than a predefined threshold SINR ($S_{TH}$) (step 204). If so, the base station 30 selects the DL resource as the resource for the D2D communication link between the wireless devices 38 and 40 (step 206). If the DL SINR for the wireless device 40 ($S_{DL,B}$) is not greater than the UL SINR for the wireless device 40 ($S_{UL,B}$) or if the DL SINR for the neighboring wireless device 44 ($S_{DL,2}$) is not greater than the predefined threshold SINR ($S_{TH}$), the base station 30 selects the UL resource as the resource for the D2D communication link between the wireless devices 38 and 40 (step 208).

Figure 7:
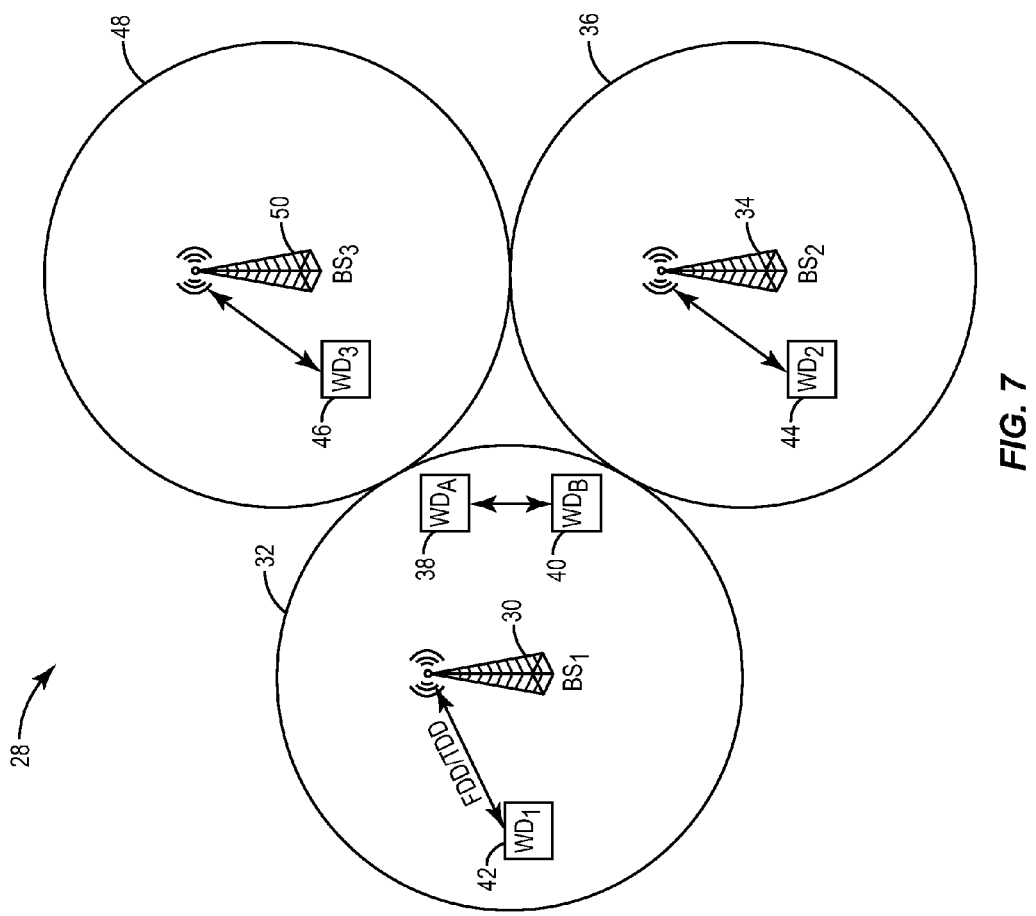
FIG. 7 illustrates the cellular communication network where a UL or DL resource of the cellular communication network is selected for a direct D2D communication link in such a manner as to minimize, or at least substantially reduce, inter-cell and/or intra-cell interference taking into account multiple neighboring cells according to one embodiment of the present disclosure.

FIG. 7 illustrates the cellular communication network 28 where the UL or DL resource of the cellular communication network 28 is selected for the direct D2D communication link in such a manner as to minimize, or at least substantially reduce, inter-cell interference according to another embodiment of the present disclosure. In this embodiment, multiple neighboring cells are taken into account. More particularly, in this example, a neighboring wireless device 46 ($WD_3$) in a neighboring cell 48 that uses the same UL and DL resources is also taken into consideration when selecting either the UL resource or the DL resource for the D2D communication link between the wireless devices 38 and 40. The neighboring cell 48 is served by a neighboring base station 50 ($BS_3$). Note that while there are only two neighboring base stations illustrated in FIG. 7 for purposes of clarity and ease of discussion, there may be more than two neighboring base stations such that more than two neighboring wireless devices are taken into consideration when selecting either the UL or DL resource for the D2D communication link between the wireless devices 38 and 40.

Figure 8:
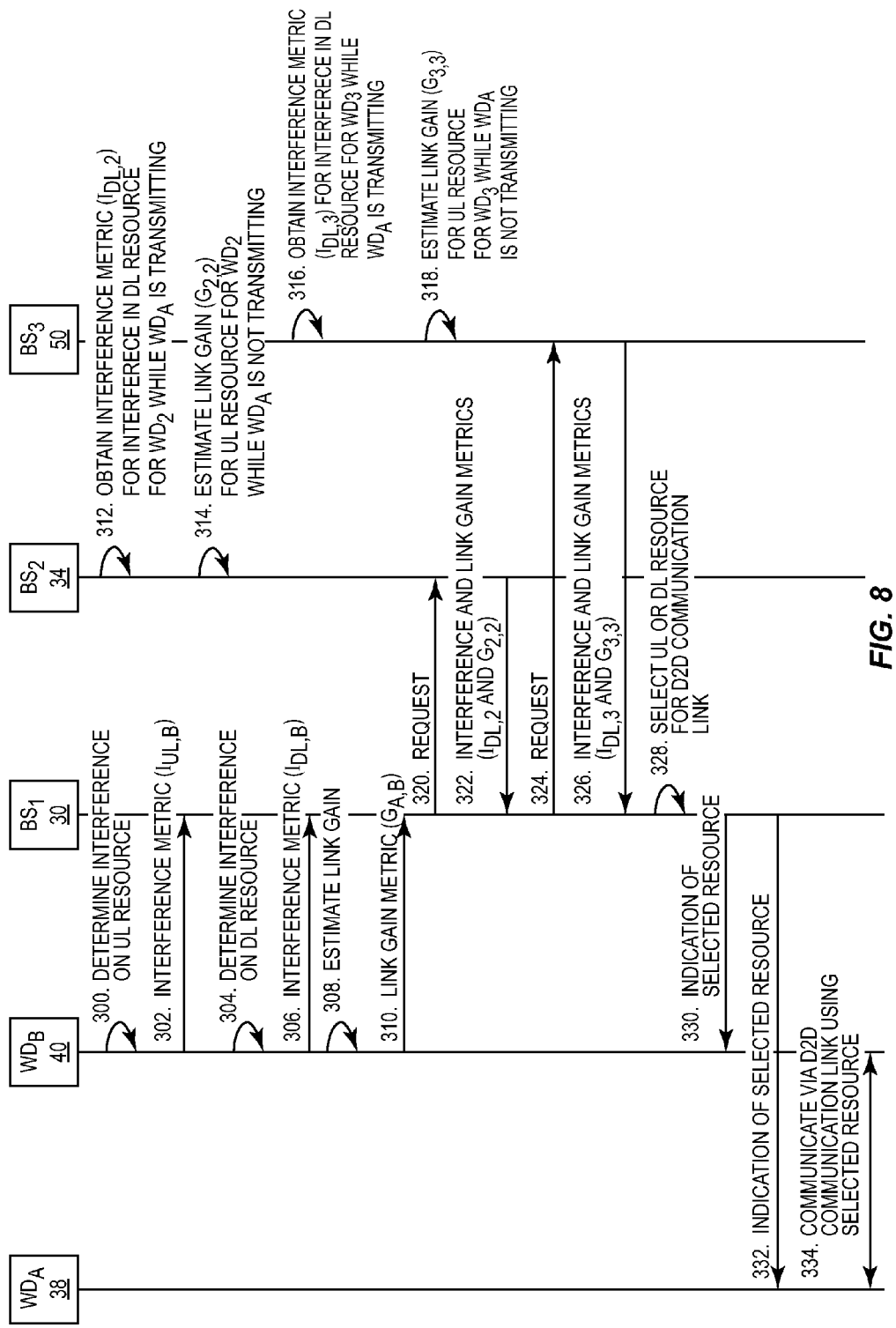
FIG. 8 illustrates the operation of the cellular communication network of FIG. 7 in which a UL or DL resource of the cellular communication network is selected for a direct D2D communication link in such a manner as to minimize, or at least substantially reduce, inter-cell interference according to one embodiment of the present disclosure.

FIG. 8 illustrates the operation of the cellular communication network 28 of FIG. 7 according to one embodiment of the present disclosure. In this embodiment, either the UL or the DL resource is selected such that inter-cell interference is minimized, or at least substantially reduced. As illustrated, the wireless device 40 ($WD_B$) determines an amount of interference on the UL resource perceived at the wireless device 40 (step 300), and provides a corresponding interference metric ($I_{UL,B}$) to the base station 30 ($BS_1$) using a conventional cellular communication link with between the wireless device 40 and the base station 30 (step 302). Preferably, the interference metric ($I_{UL,B}$) is an average value or, in other words, a metric that represents an average amount of interference on the UL resource perceived at the wireless device 40. Note, however, that in an alternative embodiment the wireless device 40 may report instantaneous interference metric values to the base station 30, where the instantaneous interference metric values are thereafter averaged to provide the interference metric ($I_{UL,B}$). The amount of interference on the uplink may be measured directly by the wireless device 40 or computed or otherwise obtained using two or more other metrics determined by the wireless device 40.

In addition, the wireless device 40 determines an amount of interference on the DL resource perceived at the wireless device 40 (step 304), and provides a corresponding interference metric ($I_{DL,B}$) to the base station 30 using a conventional cellular communication link with between the wireless device 40 and the base station 30 (step 306). Preferably, the interference metric ($I_{DL,B}$) is an average value or, in other words, a metric that represents an average amount of interference on the DL resource perceived at the wireless device 40. Note, however, that in an alternative embodiment the wireless device 40 may report instantaneous interference metric values to the base station 30, where the instantaneous interference metric values are thereafter averaged to provide the interference metric ($I_{DL,B}$). The amount of interference on the downlink may be measured directly by the wireless device 40 or computed or otherwise obtained using two or more other metrics determined by the wireless device 40.

In addition to interference, the wireless device 40 estimates a link, or path, gain between the wireless devices 38 and 40 (step 308), and provides a corresponding link gain metric ($G_{A,B}$) to the base station 30 using a conventional cellular communication link between the wireless device 40 and the base station 30 (step 310). In order to communicate, the wireless devices 38 and 40 should be able to estimate the link gain between them using conventional techniques. For example, the wireless device 40 can estimate the link gain between the wireless device 38 and the wireless device 40 using a reference signal or beacon transmitted by the wireless device 38. Preferably, the link gain metric ($G_{A,B}$) is an average value or, in other words, a metric that represents an average link gain value between the wireless devices 38 and 40. Note, however, that in an alternative embodiment the wireless device 40 may report instantaneous link gain values to the base station 30, where the instantaneous link gain values are thereafter averaged to provide the link gain metric ($G_{A,B}$). Notably, the interference metrics ($I_{UL,B}$ and $I_{DL,B}$) and the link gain metric ($G_{A,B}$) may be provided to the base station 30 proactively or in response to one or more requests from the base station 30.

In addition to obtaining the interference metrics ($I_{UL,B}$ and $I_{DL,B}$) and the link gain metric ($G_{A,B}$) from the wireless device 40, the base station 30 also obtains interference and link gain metrics from the neighboring base stations 34 and 50 for the neighboring wireless devices 44 and 46 that use the UL and DL resources. As discussed above with respect to FIG. 5, the neighboring base station 34 obtains an interference metric ($I_{DL,2}$) that represents an amount of interference perceived at the neighboring wireless device 44 on the DL resource while the wireless device 38 is transmitting on the DL resource (step 312). Notably, the interference metric ($I_{DL,2}$) may be provided from the neighboring wireless device 44 to the neighboring base station 34 proactively or in response to one or more requests from the neighboring base station 34. The neighboring base station 34 also estimates the link gain between the neighboring wireless device 44 and the neighboring base station 34 for the UL resource while the wireless device 38 is not transmitting to the wireless device 40 via the D2D communication link using the UL resource to thereby provide a link gain metric ($G_{2,2}$), as described above (step 314).

Likewise, the neighboring base station 50 ($BS_3$) obtains an interference metric ($I_{DL,3}$) that represents an amount of interference perceived at the neighboring wireless device 46 ($WD_3$) on the DL resource while the wireless device 38 is transmitting on the DL resource (step 316). Notably, the interference metric ($I_{DL,3}$) may be provided from the neighboring wireless device 46 to the neighboring base station 50 proactively or in response to one or more requests from the neighboring base station 50. The neighboring base station 50 also estimates a link gain between the neighboring wireless device 46 and the neighboring base station 50 for the UL resource while the wireless device 38 is not transmitting to the wireless device 40 via the D2D communication link using the UL resource to thereby provide a link gain metric ($G_{3,3}$) (step 318). Preferably, the interference metric ($I_{DL,3}$) and the link gain metric ($G_{3,3}$) are average values. However, in an alternative embodiment, the instantaneous metric values may be reported and thereafter averaged to provide the interference metric ($I_{DL,3}$) and the link gain metric ($G_{3,3}$).

At some point, the base station 30 sends a request to the neighboring base station 34 for the interference metric ($I_{DL,2}$) and link gain metric ($G_{2,2}$) values for the neighboring wireless device 44 that uses the DL and UL resources (step 320). In one embodiment, at this point, the base station 30 controls the wireless device 38 such that the wireless device 38 does not transmit while the neighboring base station 34 estimates a link gain between the neighboring wireless device 44 and the neighboring base station 34. The neighboring base station 34 returns the interference metric ($I_{DL,2}$) and link gain metric ($G_{2,2}$) to the base station 30 in response to the request (step 322).

Likewise, the base station 30 sends a request to the neighboring base station 50 for the interference metric ($I_{DL,3}$) and link gain metric ($G_{3,3}$) values for the neighboring wireless device 46 that uses the DL and UL resources (step 324). Again, in one embodiment, at this point, the base station 30 controls the wireless device 38 such that the wireless device 38 does not transmit while the neighboring base station 50 estimates a link gain between the neighboring wireless device 46 and the neighboring base station 50. The neighboring base station 50 returns the interference metric ($I_{DL,3}$) and the link gain metric ($G_{3,3}$) to the base station 30 in response to the request (step 326).

The base station 30 then selects either the UL resource or the DL resource as the resource for the D2D communication link between the wireless devices 38 and 40 (step 328). As discussed below in detail, the selection of either the UL resource or the DL resource is based on: (1) a link quality metric for the UL resource between the wireless devices 38 and 40 that represents a link quality between the wireless devices 38 and 40 for the UL resource and is derived based on the interference metric for the UL resource perceived by the wireless device 40 ($I_{UL,B}$) and the link gain between the wireless devices 38 and 40 ($G_{A,B}$), (2) a link quality metric for the DL resource between the wireless devices 38 and 40 that represents a link quality between the wireless devices 38 and 40 for the DL resource and is derived based on the interference metric for the DL resource perceived by the wireless device 40 ($I_{DL,B}$) and the link gain between the wireless devices 38 and 40 ($G_{A,B}$), (3) a link quality metric for the DL resource between the neighboring wireless device 44 and the neighboring base station 34 that represents a link quality between the neighboring wireless device 44 and the neighboring base station 34 for the DL resource and is derived based on the interference metric for the DL resource perceived by the neighboring wireless device 44 ($I_{DL}$), and the link gain between the neighboring wireless device 44 and the neighboring base station 34 ($G_{2,2}$), and (4) a link quality metric for the DL resource between the neighboring wireless device 46 and the neighboring base station 50 that represents a link quality between the neighboring wireless device 46 and the neighboring base station 50 for the DL resource and is derived based on the interference metric for the DL resource perceived by the neighboring wireless device 46 ($I_{DL,3}$), and the link gain between the neighboring wireless device 46 and the neighboring base station 50 ($G_{3,3}$). Once the resource for the D2D communication link is selected, the base station 30 sends an indication of the resource selected for the D2D communication link to the wireless devices 38 and 40 (steps 330 and 332). The wireless devices 38 and 40 then communicate via the D2D communication link using the resource selected for the D2D communication link (step 334). Notably, this process is preferably periodically or otherwise repeated to dynamically select the resource for the D2D communication link.

Figure 9:
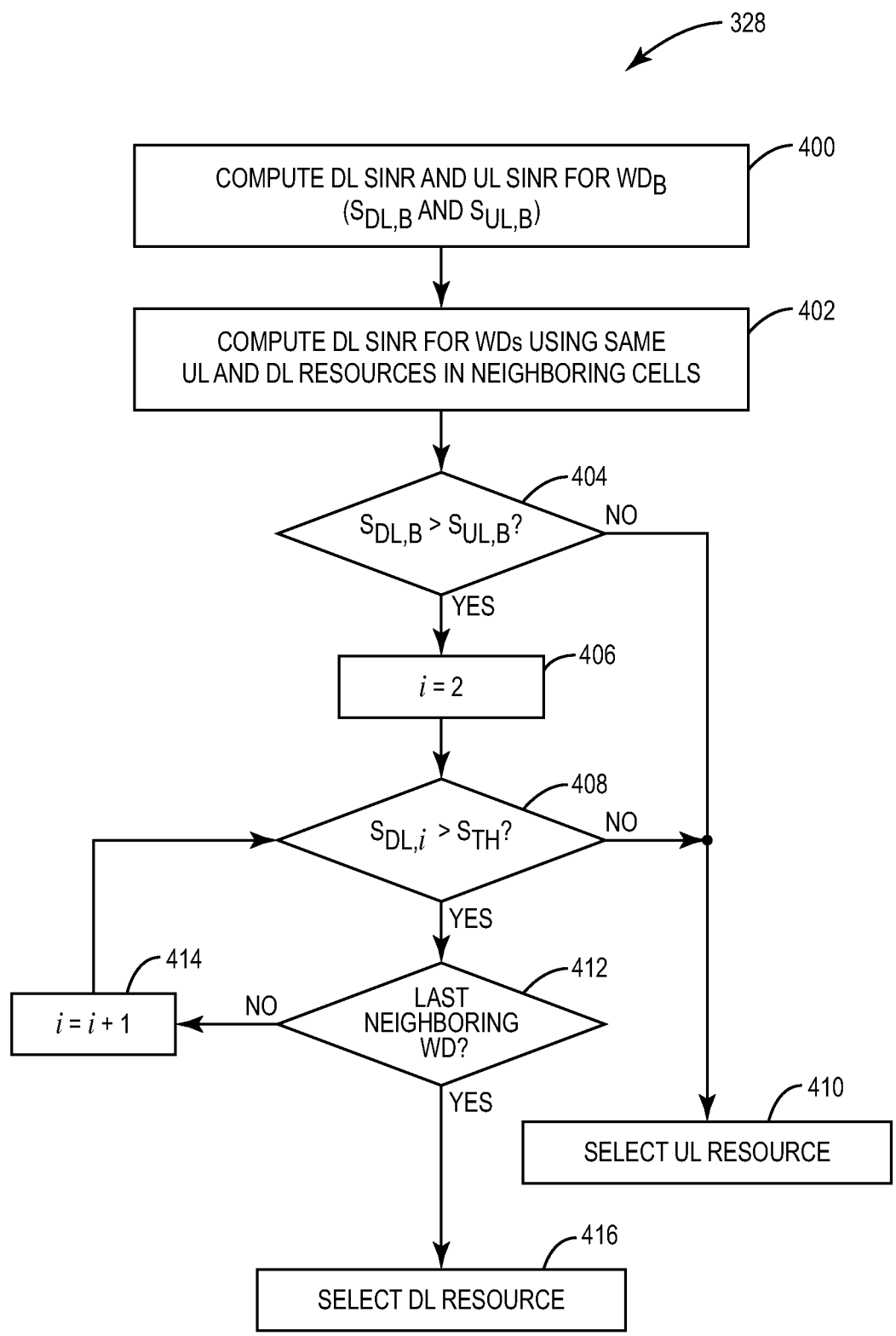
FIG. 9 is a flow chart that illustrates the step of selecting either the UL or DL resource of the cellular communication network for the direct D2D communication link of FIG. 8 in more detail according to one embodiment of the present disclosure.

FIG. 9 is a flow chart that illustrates step 328 of FIG. 8 in more detail according to one embodiment of the present disclosure. First, the base station 30 computes a DL SINR for the wireless device 40 ($S_{DL,B}$) and a UL SINR for wireless device 40 ($S_{UL,B}$) (step 400). More specifically, the DL SINR for the wireless device 40 ($S_{DL,B}$) can be computed as:

$$S_{DL,B} = \frac{P_{A,B} \times G_{A,B}}{I_{DL,B}},$$

where $P_{A,B}$ is a maximum transmit power used by the wireless device 38 when transmitting to the wireless device 40 via the D2D communication link. Similarly, the UL SINR for the wireless device 40 ($S_{UL,B}$) can be computed as:

$$S_{UL,B} = \frac{P_{A,B} \times G_{A,B}}{I_{UL,B}}.$$

In addition, the base station 30 computes a DL SINR for each of the neighboring wireless devices ($S_{DL,i}$ where according to the nomenclature of FIG. 7 i≥2 for the neighboring wireless devices), which in the example of FIGS. 7 and 8 are the wireless devices 44 and 46 (step 402). For each neighboring wireless device, the DL SINR for the neighboring wireless device can be computed as:

$$S_{DL,i} = \frac{P_{i,i} \times G_{i,i}}{I_{DL,i}},$$

where $P_{i,i}$ is a maximum transmit power used by the neighboring base station ($BS_i$) for the neighboring wireless device ($WD_i$), $G_{i,i}$ is the link gain between the neighboring base station ($BS_i$) and the corresponding neighboring wireless device ($WD_i$), and $I_{DL,i}$ is the interference for the DL resource for the neighboring wireless device ($WD_i$). Alternatively, $P_{A,B}$ and/or $P_{i,i}$ may be transmit power values actually used by the corresponding device/node when transmitting or may be average transmit power values, which can be made available to the base station 30 in a manner similar to that in which the link gain values are provided to the base station 30. If these values are not available, then the maximum transmit power value(s) may be used as $P_{A,B}$ and $P_{i,i}$. Moreover, if the maximum transmit powers are actually used, the transmit powers may thereafter be reduced using a power control feature. Again, it should be noted that the SINR values discussed above are referred to herein as link quality metrics. However, additional or alternative link quality metrics may be used.

Next, the base station 30 determines whether the DL SINR for the wireless device 40 ($S_{DL,B}$) is greater than the UL SINR for the wireless device 40 ($S_{UL,B}$) (step 404). If not, the process proceeds to step 410. If so, the base station 30 sets a counter i equal to 2 (step 406). Again, using the nomenclature of FIG. 7, the neighboring wireless devices are $WD_2$, $WD_3$, etc., whereas the wireless device $WD_1$ is an intra-cell wireless device (i.e., a wireless device located in the cell 32 along with the wireless devices 38 and 40). As such, when considering only neighboring wireless devices, the counter i is initialized to a value of 2. The base station 30 then determines whether the DL SINR for the neighboring wireless device ($WD_i$) ($S_{DL,i}$) is greater than a predefined threshold SINR ($S_{TH}$) (step 408). If not, the base station 30 selects the UL resource as the resource for the D2D communication link between the wireless devices 38 and 40 (step 410). Otherwise, the base station 30 determines whether the last neighboring wireless device ($WD_i$) has been processed (step 412). If not, the counter i is incremented (step 414), and the process returns to step 408 and is repeated. Returning to step 412, if the last neighboring wireless device ($WD_i$) has been processed and none of the DL SINRs for the neighboring wireless devices ($WD_i$) ($S_{DL,i}$) values are less than the predefined threshold SINR ($S_{TH}$), the base station 30 selects the DL resource as the resource for the D2D communication link between the wireless devices 38 and 40 (step 416).

Figure 10:
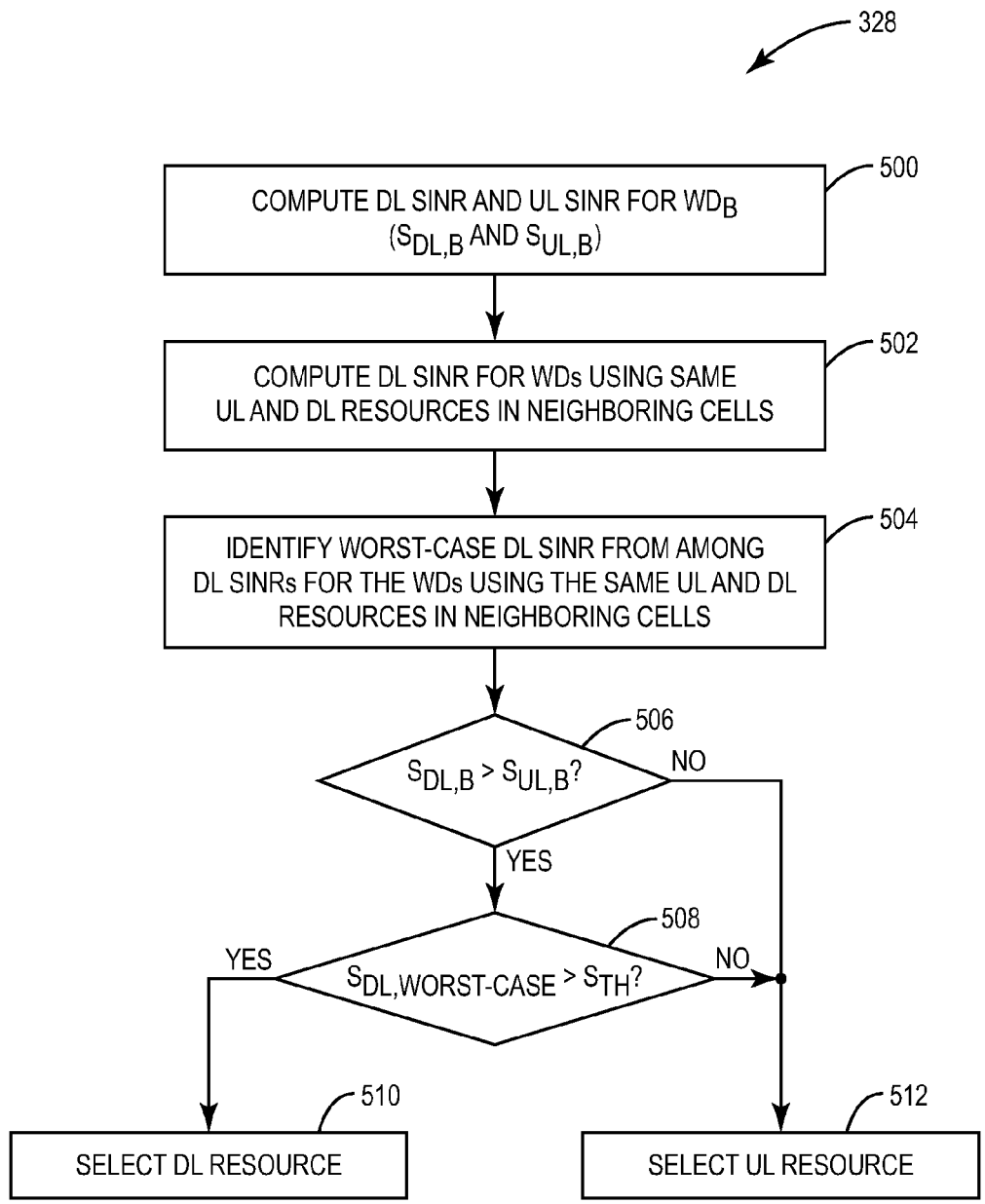
FIG. 10 is a flow chart that illustrates the step of selecting either the UL or DL resource of the cellular communication network for the direct D2D communication link of FIG. 8 in more detail according to another embodiment of the present disclosure.

FIG. 10 is a flow chart that illustrates step 328 of FIG. 8 in more detail according to another embodiment of the present disclosure. First, the base station 30 computes a DL SINR for the wireless device 40 ($S_{DL,B}$) and a UL SINR for wireless device 40 ($S_{UL,B}$) (step 500). More specifically, the DL SINR for the wireless device 40 ($S_{DL,B}$) can be computed as:

$$S_{DL,B} = \frac{P_{A,B} \times G_{A,B}}{I_{DL,B}},$$

where $P_{A,B}$ is a maximum transmit power used by the wireless device 38 when transmitting to the wireless device 40 via the D2D communication link. Similarly, the UL SINR for the wireless device 40 ($S_{UL,B}$) can be computed as:

$$S_{UL,B} = \frac{P_{A,B} \times G_{A,B}}{I_{UL,B}}.$$

In addition, the base station 30 computes a DL SINR for each of the neighboring wireless devices ($S_{DL,i}$ where according to the nomenclature of FIG. 7 $i \geq 2$ for the neighboring wireless devices), which in the example of FIGS. 7 and 8 are wireless devices 44 and 46 (step 502). For each neighboring wireless device, the DL SINR for the neighboring wireless device can be computed as:

$$S_{DL,i} = \frac{P_{i,i} \times G_{i,i}}{I_{DL,i}},$$

where $P_{i,i}$ is a maximum transmit power used by the neighboring base station ($BS_i$) for the neighboring wireless device ($WD_i$), $G_{i,i}$ is the link gain between the neighboring base station $BS_i$ and the corresponding neighboring wireless device ($WD_i$), and $I_{DL,i}$ is the interference for the DL resource for the neighboring wireless device ($WD_i$). Again, it should be noted that the SINR values discussed above are referred to herein as link quality metrics. However, additional or alternative link quality metrics may be used.

Next, the base station 30 identifies a worst-case DL SINR value ($S_{DL,WORST-CASE}$) from among the DL SINR values ($S_{DL,i}$) for the neighboring wireless devices ($WD_i$) (step 504). The worst-case SINR is the minimum DL SINR ($S_{DL,i}$) value among the neighboring wireless devices. The base station 30 then determines whether the DL SINR for the wireless device 40 ($S_{DL,B}$) is greater than the UL SINR for the wireless device 40 ($S_{UL,B}$) (step 506). If so, the base station 30 then determines whether the worst-case DL SINR ($S_{DL,WORST-CASE}$) is greater than a predefined threshold SINR ($S_{TH}$) (step 508). If so, the base station 30 selects the DL resource as the resource for the D2D communication link between the wireless devices 38 and 40 (step 510). If the DL SINR for the wireless device 40 ($S_{DL,B}$) is not greater than the UL SINR for the wireless device 40 ($S_{UL,B}$) or if the worst-case DL SINR ($S_{DL,WORST-CASE}$) is not greater than the predefined threshold SINR ($S_{TH}$), the base station 30 selects the UL resource as the resource for the D2D communication link between the wireless devices 38 and 40 (step 512).

Figure 11A:
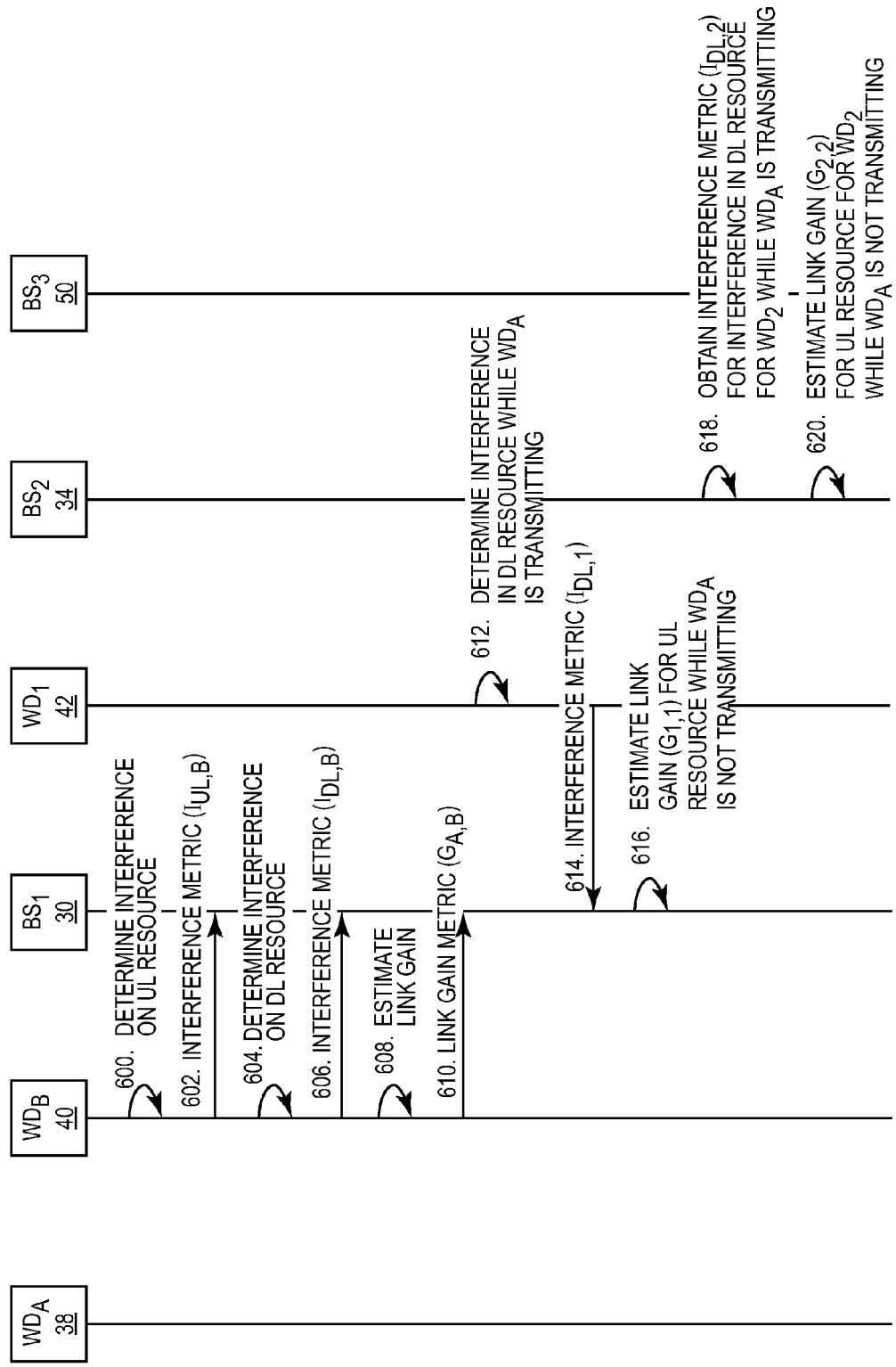
FIGS. 11A and 11B illustrate the operation of the cellular communication network of FIG. 7 in which a UL or DL resource of the cellular communication network is selected for a direct D2D communication link in such a manner as to minimize, or at least substantially reduce, both intra-cell and inter-cell interference according to another embodiment of the present disclosure.
Figure 11B:
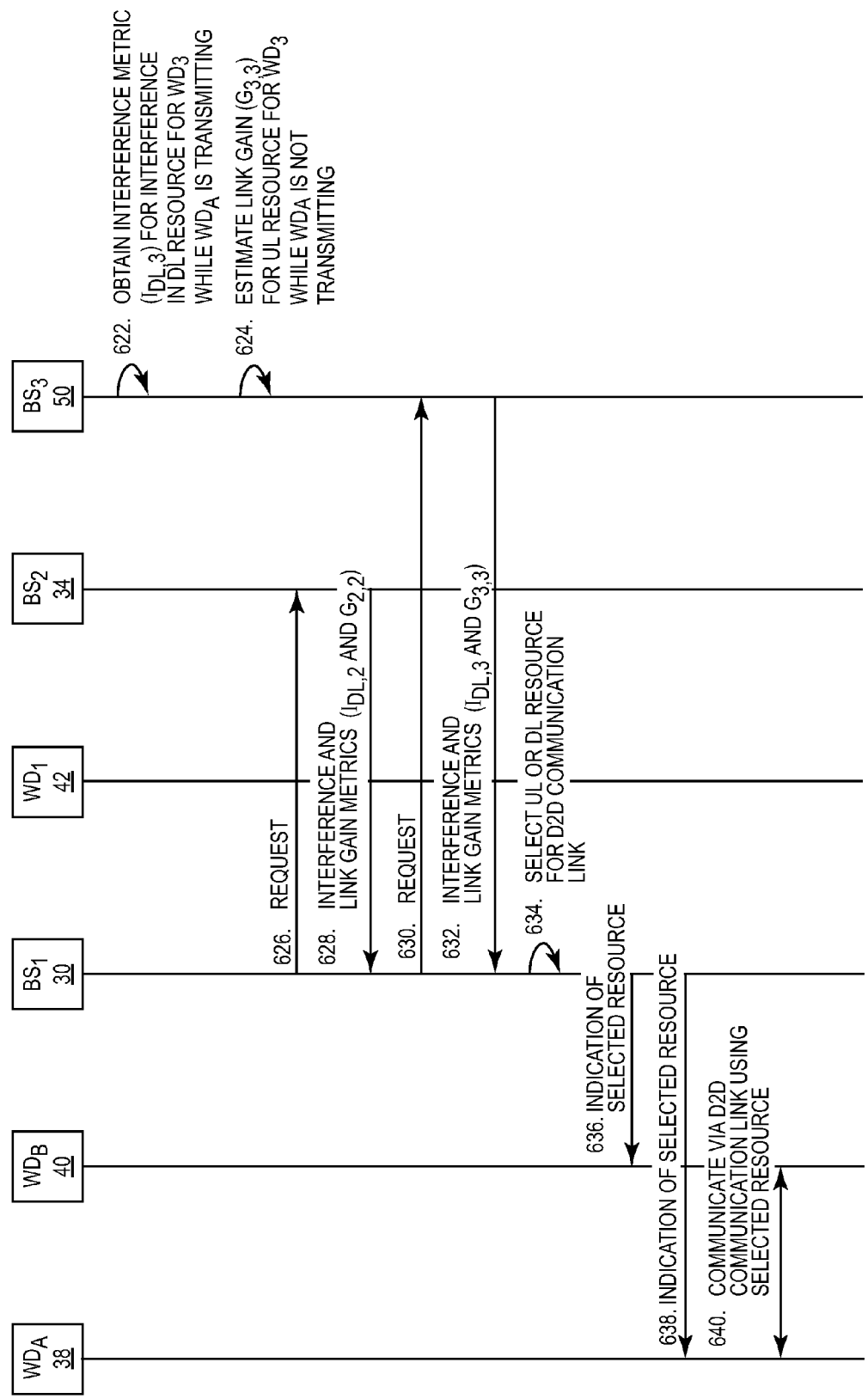

FIGS. 11A and 11B illustrate the operation of the cellular communication network 28 of FIG. 7 according to one embodiment of the present disclosure. In this embodiment, either the UL or the DL resource is selected such that both intra-cell and inter-cell interference is minimized, or at least substantially reduced. As illustrated, the wireless device 40 ($WD_B$) determines an amount of interference on the UL resource perceived at the wireless device 40 (step 600), and provides a corresponding interference metric ($I_{UL,B}$) to the base station 30 ($BS_1$) using a conventional cellular communication link with between the wireless device 40 and the base station 30 (step 602). The amount of interference on the uplink may be measured directly by the wireless device 40 or computed or otherwise obtained using two or more other metrics determined by the wireless device 40. In addition, the wireless device 40 determines an amount of interference on the DL resource perceived at the wireless device 40 (step 604), and provides a corresponding interference metric ($I_{DL,B}$) to the base station 30 using a conventional cellular communication link between the wireless device 40 and the base station 30 (step 606). The amount of interference on the downlink may be measured directly by the wireless device 40 or computed or otherwise obtained using two or more other metrics determined by the wireless device 40.

In addition to interference, the wireless device 40 estimates a link, or path, gain between the wireless devices 38 and 40 (step 608), and provides a corresponding link gain metric ($G_{A,B}$) to the base station 30 using a conventional cellular communication link between the wireless device 40 and the base station 30 (step 610). In order to communicate, the wireless devices 38 and 40 should be able to estimate the link gain between them using conventional techniques. For example, the wireless device 40 can estimate the link gain between the wireless device 38 and the wireless device 40 using a reference signal or beacon transmitted by the wireless device 38. Notably, the interference metrics ($I_{UL,B}$ and $I_{DL,B}$) and the link gain metric ($G_{A,B}$) may be provided to the base station 30 proactively or in response to one or more requests from the base station 30.

In addition to obtaining the interference metrics ($I_{UL,B}$ and $I_{DL,B}$) and the link gain metric ($G_{A,B}$) from the wireless device 40, the base station 30 also obtains interference and link gain metrics for the wireless device 42 ($WD_1$), which is referred to herein as an intra-cell wireless device. More specifically, the wireless device 42 determines an amount of interference on the DL resource perceived at the neighboring wireless device 42 while the wireless device 38 is transmitting on the DL resource (step 612), and provides a corresponding interference metric ($I_{DL,1}$) to the base station 30 using a conventional cellular communication link between the wireless device 42 and the base station 30 (step 614). Notably, the interference metric ($I_{DL,1}$) may be provided to the base station 30 proactively or in response to one or more requests from the base station 30.

In one particular embodiment, in order to obtain the interference metric ($I_{DL,1}$), the wireless device 42 detects a reference signal sent by the wireless device 38 using the DL resource and estimates the power of the reference signal. This reference signal could be, for example, structurally similar to the reference signal, or reference symbols, of the base station 30. Further, the reference signal detected by the wireless device 42 may be the same signal sent from the wireless device 38 to the wireless device 40 for path gain estimation for the DL resource. The wireless device 42 then determines the interference metric ($I_{DL,1}$) based on the estimated power of the reference signal from the wireless device 38 (e.g., as if the wireless device 38 were an interfering base station) and total received power received from all network nodes transmitting on the DL resource. Depending on how the total received power is measured, the interference metric ($I_{DL,1}$) may be determined by subtracting received power from the base station 30 from the total received power from all network nodes transmitting on the DL resource. Alternatively, if the wireless device 42 is not able to measure the total received power directly but is capable of detecting and estimating the power of individual reference signals, the wireless device 42 may determine the interference metric ($I_{DL,1}$) by summing the estimated power of the individual reference signals and then subtracting the received power from the base station 30 from the sum of the estimated power of the individual reference signals. Lastly, it should be noted that for the unlikely case where the power received from the wireless device 38 by the wireless device 42 on the DL resource is negligible (i.e., the reference signal from the wireless device 38 is too weak), then the interference metric ($I_{DL,1}$) may be set to zero or some other value that represents negligible interference.

In another embodiment, in order for the wireless device 42 to obtain the interference metric ($I_{DL,1}$), the base station 30 provides schedule synchronization or coordination such that the wireless device 42 receives information from the base station 30 that indicates one or more times at which the wireless device 38 will be transmitting using the DL resource. Using this information, the wireless device 42 determines an amount of interference on the DL resource while the wireless device 38 is transmitting. Alternatively, the base station 30 may obtain information that indicates one or more times at which the wireless device 42 will expect a transmission by the wireless device 38. The base station 30 then schedules a transmission by the wireless device 38 on the DL resource at the time(s) expected by the wireless device 42. The wireless device 42 is then enabled to determine an amount of interference on the DL resource when the wireless device 38 is transmitting on the DL resource.

The base station 30 also estimates a link gain between the wireless device 42 and the base station 30 for the UL resource while the wireless device 38 is not transmitting to the wireless device 40 via the D2D communication link using the UL resource to thereby provide a link gain metric ($G_{1,1}$) (step 616). The base station 30 also obtains interference and link gain metrics from the neighboring base stations 34 and 50 for the neighboring wireless devices 44 and 46 that use the UL and DL resources. As discussed above with respect to FIG. 5, the neighboring base station 34 obtains the interference metric ($I_{DL,2}$) that represents an amount of interference perceived at the neighboring wireless device 44 on the DL resource while the wireless device 38 is transmitting on the DL resource (step 618). Notably, the interference metric ($I_{DL,2}$) may be provided from the neighboring wireless device 44 to the neighboring base station 34 proactively or in response to one or more requests from the neighboring base station 34. The neighboring base station 34 also estimates the link gain between the neighboring wireless device 44 and the neighboring base station 34 for the UL resource while the wireless device 38 is not transmitting to the wireless device 40 via the D2D communication link using the UL resource to thereby provide a link gain metric ($G_{2,2}$), as described above (step 620).

Likewise, the neighboring base station 50 obtains an interference metric ($I_{DL,3}$) that represents an amount of interference perceived at the neighboring wireless device 46 on the DL resource while the wireless device 38 is transmitting on the DL resource (step 622). Notably, the interference metric ($I_{DL,3}$) may be provided from the neighboring wireless device 46 to the neighboring base station 50 proactively or in response to one or more requests from the neighboring base station 50. The neighboring base station 50 also estimates a link gain between the neighboring wireless device 46 and the neighboring base station 50 for the UL resource while the wireless device 38 is not transmitting to the wireless device 40 via the D2D communication link using the UL resource to thereby provide a link gain metric ($G_{3,3}$) (step 624).

At some point, the base station 30 sends a request to the neighboring base station 34 for the interference metric ($I_{DL,2}$) and link gain metric ($G_{2,2}$) values for the neighboring wireless device 44 that uses the DL and UL resources (step 626). The neighboring base station 34 returns the interference metric ($I_{DL,2}$) and the link gain metric ($G_{2,2}$) to the base station 30 in response to the request (step 628).

Likewise, the base station 30 sends a request to the neighboring base station 50 for the interference metric ($I_{DL,3}$) and link gain metric ($G_{3,3}$) values for the neighboring wireless device 50 that uses the DL and UL resources (step 630). The neighboring base station 50 returns the interference metric ($I_{DL,3}$) and the link gain metric ($G_{3,3}$) to the base station 30 in response to the request (step 632).

The base station 30 then selects either the UL resource or the DL resource as the resource for the D2D communication link between the wireless devices 38 and 40 (step 634). As discussed below in detail, the selection of either the UL resource or the DL resource is based on: (1) a link quality metric for the UL resource between the wireless devices 38 and 40 that represents a link quality between the wireless devices 38 and 40 for the UL resource and is derived based on the interference metric for the UL resource perceived by the wireless device 40 ($I_{UL,B}$) and the link gain between the wireless devices 38 and 40 ($G_{A,B}$), (2) a link quality metric for the DL resource between the wireless devices 38 and 40 that represents a link quality between the wireless devices 38 and 40 for the DL resource and is derived based on the interference metric for the DL resource perceived by the wireless device 40 ($I_{DL,B}$) and the link gain between the wireless devices 38 and 40 ($G_{A,B}$), (3) a link quality metric for the DL resource between the wireless device 42 and the base station 30 that represents a link quality between the wireless device 42 and the base station 30 for the DL resource and is derived based on the interference metric for the DL resource perceived by the wireless device 42 ($I_{DL,1}$), and the link gain between the wireless device 42 and the base station 30 ($G_{1,1}$), (4) a link quality metric for the DL resource between the neighboring wireless device 44 and the neighboring base station 34 that represents a link quality between the neighboring wireless device 44 and the neighboring base station 34 for the DL resource and is derived based on the interference metric for the DL resource perceived by the neighboring wireless device 44 ($I_{DL,2}$), and the link gain between the neighboring wireless device 44 and the neighboring base station 34 ($G_{2,2}$), and (5) a link quality metric for the DL resource between the neighboring wireless device 46 and the neighboring base station 50 that represents a link quality between the neighboring wireless device 46 and the neighboring base station 50 for the DL resource and is derived based on the interference metric for the DL resource perceived by the neighboring wireless device 46 ($I_{DL,3}$) and the link gain between the neighboring wireless device 46 and the neighboring base station 50 ($G_{3,3}$). Once the resource for the D2D communication link is selected, the base station 34 sends an indication of the resource selected for the D2D communication link to the wireless devices 38 and 40 (steps 636 and 638). The wireless devices 38 and 40 then communicate via the D2D communication link using the resource selected for the D2D communication link (step 640). Notably, this process is preferably periodically or otherwise repeated to dynamically select the resource for the D2D communication link.

Figure 12:
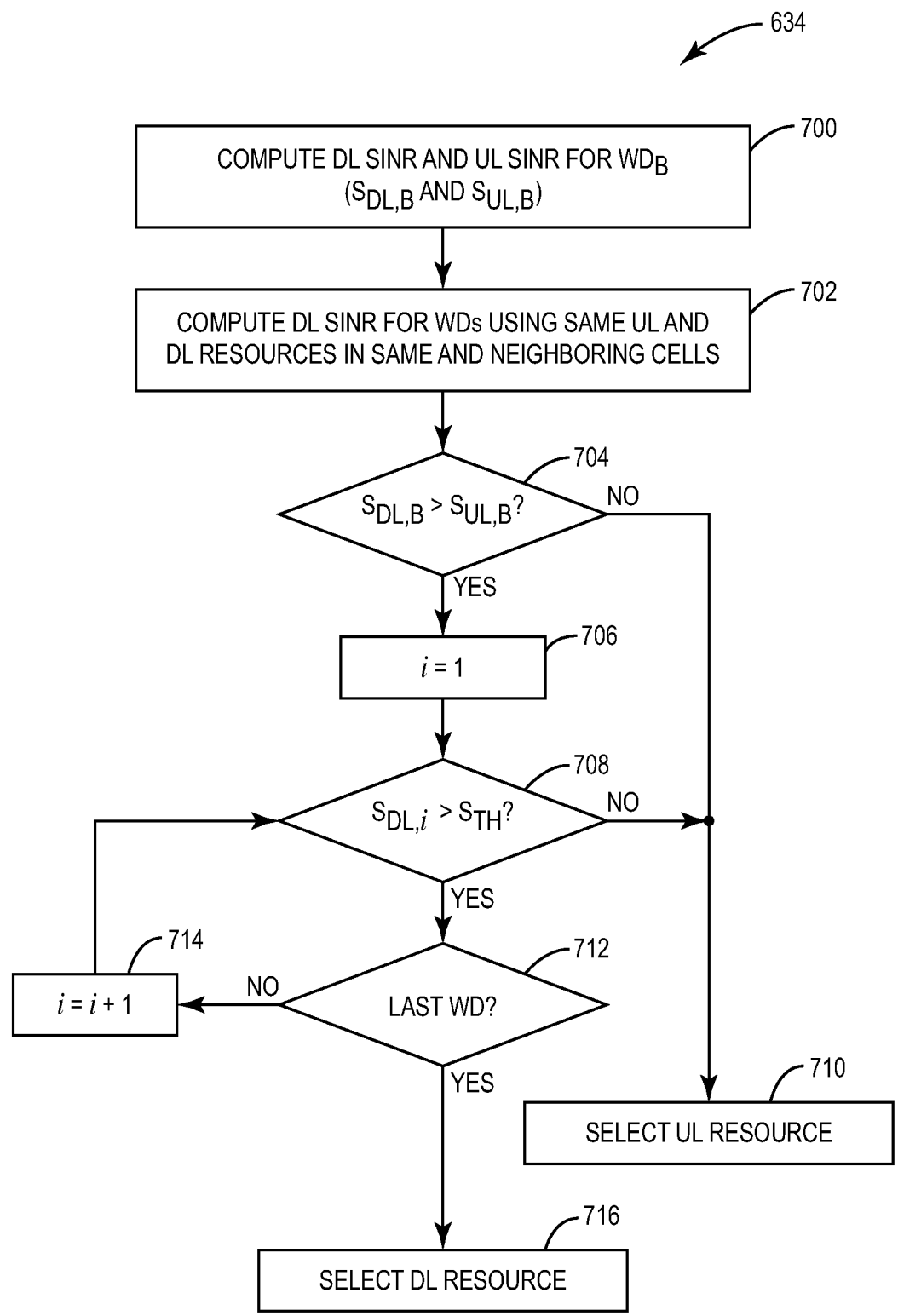
FIG. 12 is a flow chart that illustrates the step of selecting either the UL or DL resource of the cellular communication network for the direct D2D communication link of FIGS. 11A and 11B in more detail according to one embodiment of the present disclosure.

FIG. 12 is a flow chart that illustrates step 634 of FIG. 11B in more detail according to one embodiment of the present disclosure. First, the base station 30 computes a DL SINR for the wireless device 40 ($S_{DL,B}$) and a UL SINR for wireless device 40 ($S_{UL,B}$) (step 700). More specifically, the DL SINR for the wireless device 40 ($S_{DL,B}$) can be computed as:

$$S_{DL,B} = \frac{P_{A,B} \times G_{A,B}}{I_{DL,B}},$$

where $P_{A,B}$ is a maximum transmit power used by the wireless device 38 when transmitting to the wireless device 40 via the D2D communication link. Similarly, the UL SINR for the wireless device 40 ($S_{UL,B}$) can be computed as:

$$S_{UL,B} = \frac{P_{A,B} \times G_{A,B}}{I_{UL,B}}.$$

In addition, the base station 30 computes a DL SINR for the wireless device 40 (i.e., the intra-cell wireless device) and each of the neighboring wireless devices ($S_{DL,i}$ where according to the nomenclature of FIG. 7 i=1 for the wireless device 40 and i≥2 for the neighboring wireless devices), which in the example of FIGS. 7 and 8 are the wireless devices 42, 44, and 46 (step 702). For the intra-cell wireless device and each of the neighboring wireless devices, the DL SINR for the wireless device can be computed as:

$$S_{DL,i} = \frac{P_{i,i} \times G_{i,i}}{I_{DL,i}},$$

where $P_{i,i}$ is a maximum transmit power used by the base station ($BS_i$) for the wireless device ($WD_i$), $G_{i,i}$ is the link gain between the base station ($BS_i$) and the wireless device ($WD_i$), and $I_{DL,i}$ is the interference for the DL resource for the wireless device ($WD_i$). Again, it should be noted that the SINR values discussed above are referred to herein as link quality metrics. However, additional or alternative link quality metrics may be used.

Next, the base station 30 determines whether the DL SINR for the wireless device 40 ($S_{DL,B}$) is greater than the UL SINR for the wireless device 40 ($S_{UL,B}$) (step 704). If not, the process proceeds to step 710. If so, the base station 30 sets a counter i equal to 1 (step 706). By setting the counter i to 1, according to the nomenclature of FIG. 7, both the intra-cell wireless device and the neighboring wireless devices are considered when selecting either the UL or DL resource as the resource for the D2D communication link between the wireless devices 38 and 40. The base station 30 then determines whether the DL SINR for the wireless device ($WD_i$) ($S_{DL,i}$) is greater than a predefined threshold SINR ($S_{TH}$) (step 708). If not, the base station 30 selects the UL resource as the resource for the D2D communication link between the wireless devices 38 and 40 (step 710). Otherwise, the base station 30 determines whether the last intra-cell or neighboring wireless device has been processed (step 712). If not, the counter i is incremented (step 714), and the process returns to step 708 and is repeated. Returning to step 712, if the last wireless device has been processed and none of the DL SINRs for the wireless devices ($S_{DL,i}$) values are less than the predefined threshold SINR ($S_{TH}$), the base station 30 selects the DL resource as the resource for the D2D communication link between the wireless devices 38 and 40 (step 716).

Figure 13:
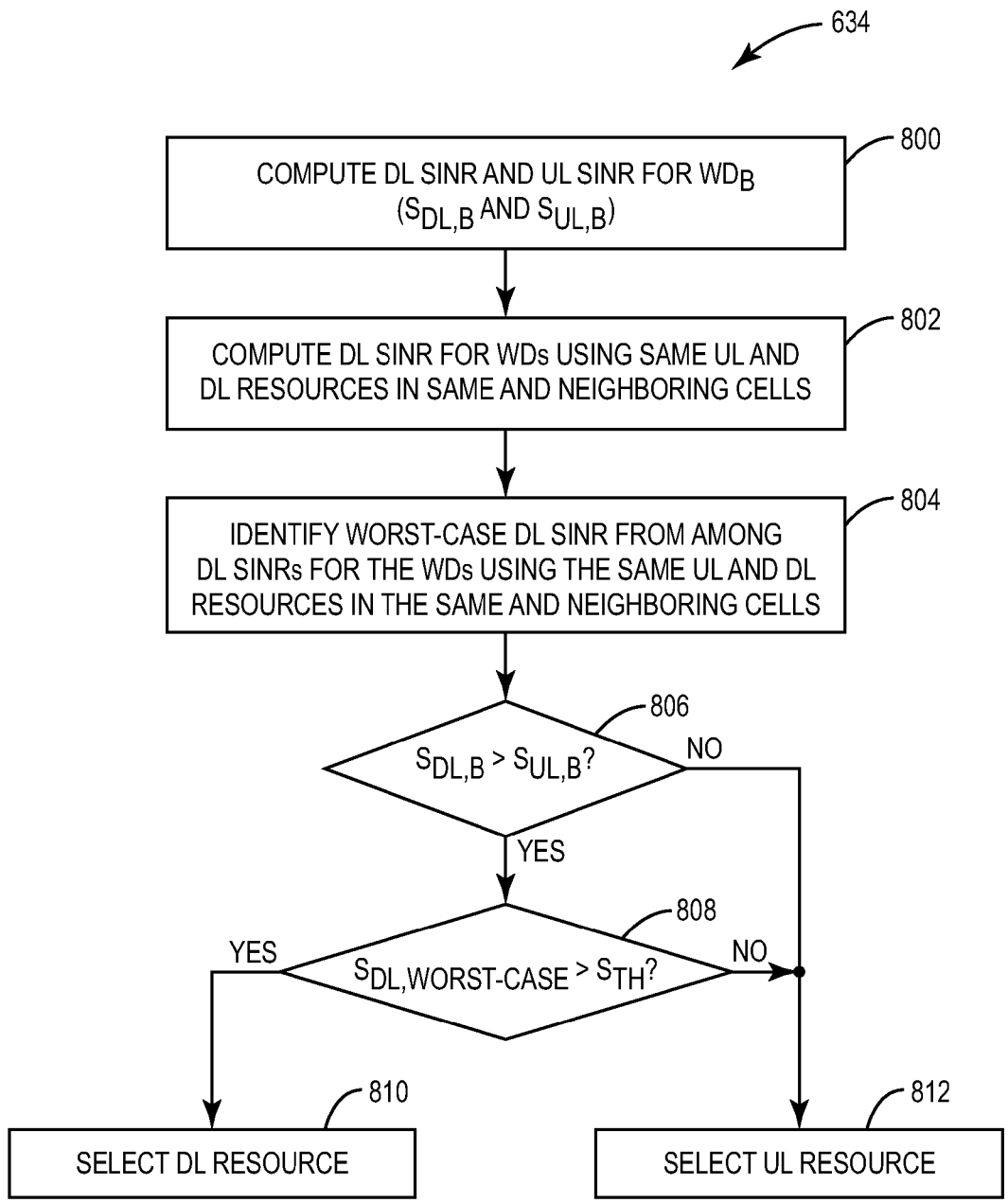
FIG. 13 is a flow chart that illustrates the step of selecting either the UL or DL resource of the cellular communication network for the direct D2D communication link of FIGS. 11A and 11B in more detail according to another embodiment of the present disclosure.

FIG. 13 is a flow chart that illustrates step 634 of FIG. 11B in more detail according to another embodiment of the present disclosure. First, the base station 30 computes a DL SINR for the wireless device 40 ($S_{DL,B}$) and a UL SINR for wireless device 40 ($S_{UL,B}$) (step 800). More specifically, the DL SINR for the wireless device 40 ($S_{DL,B}$) can be computed as:

$$S_{DL,B} = \frac{P_{A,B} \times G_{A,B}}{I_{DL,B}},$$

where $P_{A,B}$ is a maximum transmit power used by the wireless device 38 when transmitting to the wireless device 40 via the D2D communication link. Similarly, the UL SINR for the wireless device 40 ($S_{UL,B}$) can be computed as:

$$S_{UL,B} = \frac{P_{A,B} \times G_{A,B}}{I_{UL,B}}.$$

In addition, the base station 30 computes a DL SINR for the wireless device 40 (i.e., the intra-cell wireless device) and each of the neighboring wireless devices ($S_{DL,i}$ where according to the nomenclature of FIG. 7 i=1 for the wireless device 40 and i≥2 for the neighboring wireless devices), which in the example of FIGS. 7 and 8 are the wireless devices 42, 44, and 46 (step 802). For the intra-cell wireless device and each of the neighboring wireless devices, the DL SINR for the wireless device can be computed as:

$$S_{DL,i} = \frac{P_{i,i} \times G_{i,i}}{I_{DL,i}},$$

where $P_{i,i}$ is a maximum transmit power used by the base station ($BS_i$) for the wireless device ($WD_i$), $G_{i,i}$ is the link gain between the base station ($BS_i$) and the wireless device ($WD_i$), and $I_{DL,i}$ is the interference for the DL resource for the wireless device ($WD_i$). Again, it should be noted that the SINR values discussed above are referred to herein as link quality metrics. However, additional or alternative link quality metrics may be used.

Next, the base station 30 identifies a worst-case DL SINR value ($S_{DL,WORST-CASE}$) from among the DL SINR values ($S_{DL,i}$) for the intra-cell wireless device and the neighboring wireless devices (step 804). The worst-case SINR is the minimum DL SINR ($S_{DL,i}$) value among the DL SINR ($S_{DL,i}$) values. The base station 30 then determines whether the DL SINR for the wireless device 40 ($S_{DL,B}$) is greater than the UL SINR for the wireless device 40 ($S_{UL,B}$) (step 806). If so, the base station 30 then determines whether the worst-case DL SINR ($S_{DL,WORST-CASE}$) is greater than a predefined threshold SINR ($S_{TH}$) (step 808). If so, the base station 30 selects the DL resource as the resource for the D2D communication link between the wireless devices 38 and 40 (step 810). If the DL SINR for the wireless device 40 ($S_{DL,B}$) is not greater than the UL SINR for the wireless device 40 ($S_{UL,B}$) or if the worst-case DL SINR ($S_{DL,WORST-CASE}$) is not greater than the predefined threshold SINR ($S_{TH}$), the base station 30 selects the UL resource as the resource for the D2D communication link between the wireless devices 38 and 40 (step 812).

FIG. 14 illustrates the cellular communication network 28 where the UL or DL resource of the cellular communication network 28 is selected for the direct D2D communication link in such a manner as to minimize, or at least substantially reduce, intra-cell interference according to another embodiment of the present disclosure. FIG. 15 illustrates the operation of the cellular communication network of FIG. 14 according to one embodiment of the present disclosure. As illustrated, the wireless device 40 ($WD_B$) determines an amount of interference on the UL resource perceived at the wireless device 40 (step 900), and provides a corresponding interference metric ($I_{UL,B}$) to the base station 30 ($BS_1$) using a conventional cellular communication link with between the wireless device 40 and the base station 30 (step 902). The amount of interference on the uplink may be measured directly by the wireless device 40 or computed or otherwise obtained using two or more other metrics determined by the wireless device 40. In addition, the wireless device 40 determines an amount of interference on the DL resource perceived at the wireless device 40 (step 904), and provides a corresponding interference metric ($I_{DL,B}$) to the base station 30 using a conventional cellular communication link between the wireless device 40 and the base station 30 (step 906). The amount of interference on the downlink may be measured directly by the wireless device 40 or computed or otherwise obtained using two or more other metrics determined by the wireless device 40.

In addition to interference, the wireless device 40 estimates a link, or path, gain between the wireless devices 38 and 40 (step 908), and provides a corresponding link gain metric ($G_{A,B}$) to the base station 30 using a conventional cellular communication link between the wireless device 40 and the base station 30 (step 910). In order to communicate, the wireless devices 38 and 40 should be able to estimate the link gain between them using conventional techniques. For example, the wireless device 40 can estimate the link gain between the wireless device 38 and the wireless device 40 using a reference signal or beacon transmitted by the wireless device 38. Notably, the interference metrics ($I_{UL,B}$ and $I_{DL,B}$) and the link gain metric ($G_{A,B}$) may be provided to the base station 30 proactively or in response to one or more requests from the base station 30.

In addition to obtaining the interference metrics ($I_{UL,B}$ and $I_{DL,B}$) and the link gain metric ($G_{A,B}$) from the wireless device 40, the base station 30 also obtains interference and link gain metrics for the wireless device 42 ($WD_1$), which is referred to herein as an intra-cell wireless device. More specifically, the wireless device 42 determines an amount of interference on the DL resource perceived at the neighboring wireless device 42 while the wireless device 38 is transmitting on the DL resource (step 912), and provides a corresponding interference metric ($I_{DL,1}$) to the base station 30 using a conventional cellular communication link between the wireless device 42 and the base station 30, as described above with respect to FIG. 13 (step 914). Again, the interference metric ($I_{DL,1}$) may be provided to the base station 30 proactively or in response to one or more requests from the base station 30. The base station 30 also estimates a link gain between the wireless device 42 and the base station 30 for the UL resource while the wireless device 38 is not transmitting to the wireless device 40 via the D2D communication link using the UL resource to thereby provide a link gain metric ($G_{1,1}$) (step 916).

The base station 30 then selects either the UL resource or the DL resource as the resource for the D2D communication link between the wireless devices 38 and 40 (step 918). The selection of either the UL resource or the DL resource is based on: (1) a link quality metric for the UL resource between the wireless devices 38 and 40 that represents a link quality between the wireless devices 38 and 40 for the UL resource and is derived based on the interference metric for the UL resource perceived by the wireless device 40 ($I_{UL,B}$) and the link gain between the wireless devices 38 and 40 ($G_{A,B}$), (2) a link quality metric for the DL resource between the wireless devices 38 and 40 that represents a link quality between the wireless devices 38 and 40 for the DL resource and is derived based on the interference metric for the DL resource perceived by the wireless device 40 ($I_{DL,B}$) and the link gain between the wireless device 38 and 40 ($G_{A,B}$), and (3) a link quality metric for the DL resource between the wireless device 42 and the base station 30 that represents a link quality between the wireless device 42 and the base station 30 for the DL resource and is derived based on the interference metric for the DL resource perceived by the wireless device 42 ($I_{DL,1}$), and the link gain between the wireless device 42 and the base station 30 ($G_{1,1}$).

More specifically, in a manner similar that described above with respect to the other embodiments, the base station 30 selects the DL resource if the link quality between the wireless devices 38 and 40 for the DL resource is better than the link quality between the wireless devices 38 and 40 for the UL resource and the link quality between the wireless device 42 and the base station 30 for the DL resource while the wireless device 38 is transmitting on the DL resource is better than a predefined threshold link quality level. Otherwise, the UL resource is selected. Once the resource for the D2D communication link is selected, the base station 34 sends an indication of the resource selected for the D2D communication link to the wireless devices 38 and 40 (steps 920 and 922). The wireless devices 38 and 40 then communicate via the D2D communication link using the resource selected for the D2D communication link (step 924). Notably, this process is preferably periodically or otherwise repeated to dynamically select the resource for the D2D communication link.

FIG. 16 is a block diagram of one example of a base station 52 according to one embodiment of the present disclosure. The base station 52 may be the base station 30, 34, or 50 discussed above. The base station 52 includes one or more transceiver sub-systems 54 and a processing sub-system 56. At least one of the transceiver sub-systems 54 generally includes analog and, in some embodiments, digital components for wirelessly sending and receiving messages to and from wireless devices in the cellular communication network 28. In particular embodiments, the transceiver sub-systems 54 may represent or include radio-frequency (RF) transceivers, or separate RF transmitters and receivers, capable of transmitting such messages and/or other suitable information wirelessly to wireless devices such as the wireless devices 38, 40, 42, 44, and 46. The processing sub-system 56 is implemented in hardware or a combination of hardware and software. In general, the processing sub-system 56 operates to communicate with the wireless devices and potentially other base stations via the transceiver sub-system(s) 54 to perform the D2D resource selection process described herein.

In particular embodiments, the processing sub-system 56 may comprise, for example, one or several general-purpose or special-purpose microprocessors or other microcontrollers programmed with suitable software and/or firmware to carry out some or all of the functionality of the base station 30, 34, or 50 described herein. In addition or alternatively, the processing sub-system 56 may comprise various digital hardware blocks (e.g., one or more Application Specific Integrated Circuits (ASICs), one or more off-the-shelf digital and analog hardware components, or a combination thereof) configured to carry out some or all of the functionality of the base station 30, 34, or 50 described herein. Additionally, in particular embodiments, the above described functionality of the base station 30, 34, or 50 may be implemented, in whole or in part, by the processing sub-system 56 executing software or other instructions stored on a non-transitory computer-readable medium, such as random access memory (RAM), read only memory (ROM), a magnetic storage device, an optical storage device, or any other suitable type of data storage components.

FIG. 17 is a block diagram of one example of a wireless device 58 according to one embodiment of the present disclosure. The wireless device 58 may be the wireless device 38, 40, 42, 44, and 46 discussed above. The wireless device 58 includes one or more transceiver sub-systems 60 and a processing sub-system 62. At least one of the transceiver sub-systems 60 generally includes analog and, in some embodiments, digital components for wirelessly sending and receiving messages to and from base stations or other wireless devices in the cellular communication network 28. In particular embodiments, the transceiver sub-systems 60 may represent or include RF transceivers, or separate RF transmitters and receivers, capable of transmitting such messages and/or other suitable information wirelessly to base stations or other wireless devices. The processing sub-system 62 is implemented in hardware or a combination of hardware and software. In general, the processing sub-system 62 operates to communicate with the base station(s) 30, 34, or 50 via the transceiver sub-system(s) 60 to perform the D2D resource selection process described herein.

In particular embodiments, the processing sub-system 62 may comprise, for example, one or several general-purpose or special-purpose microprocessors or other microcontrollers programmed with suitable software and/or firmware to carry out some or all of the functionality of the wireless device 38, 40, 42, 44, or 46 described herein. In addition or alternatively, the processing sub-system 62 may comprise various digital hardware blocks (e.g., one or more ASICs, one or more off-the-shelf digital and analog hardware components, or a combination thereof) configured to carry out some or all of the functionality of the wireless device 38, 40, 42, 44, or 46 described herein. Additionally, in particular embodiments, the above described functionality of the wireless devices 38, 40, 42, 44, or 46 may be implemented, in whole or in part, by the processing sub-system 62 executing software or other instructions stored on a non-transitory computer-readable medium, such as RAM, ROM, a magnetic storage device, an optical storage device, or any other suitable type of data storage components.

The following acronyms are used throughout this disclosure.
ASIC Application Specific Integrated Circuit
BS Base Station
D2D Device to Device
DL Downlink
eNB eNodeB
FDD Frequency Division Duplex
LTE Long Term Evolution
RAM Random Access Memory
RF Radio Frequency
ROM Read Only Memory
RSRP Reference Signal Received Power
RSRQ Reference Signal Received Quality
SINR Signal to Interference plus Noise Ratio
TDD Time Division Duplex
UL Uplink
WD Wireless Device Those skilled in the art will recognize improvements and modifications to the preferred embodiments of the present disclosure. All such improvements and modifications are considered within the scope of the concepts disclosed herein and the claims that follow.

What is claimed is:

1. A network node configured to select a resource for a direct device to device communication link between a first wireless device and a second wireless device in a cellular communication network, comprising:
   a transceiver sub-system configured to enable wireless communication; and
   a processing sub-system associated with the transceiver sub-system configured to:
   select either an uplink resource or a downlink resource of the cellular communication network as a resource for the direct device to device communication link between the first wireless device and the second wireless device located in a first cell of the cellular communication network served by a first base station based on:
      a link quality metric that represents a link quality between the first and second wireless devices for the uplink resource of the cellular communication network;
      a link quality metric that represents a link quality between the first and second wireless devices for the downlink resource of the cellular communication network; and
      a link quality metric that represents a link quality between a third wireless device and a base station for the downlink resource that occurs when the first wireless device transmits to the second wireless device using the downlink resource; and
   inform the first and second wireless devices of the resource selected for the direct device to device communication link.

2. The network node of claim 1 wherein the third wireless device is located in a second cell that neighbors the first cell in the cellular communication network, and the base station is a second base station that serves the second cell.

3. The network node of claim 2 wherein the network node is the first base station that serves the first cell in which the first and second wireless devices are located, and the processing sub-system is further configured to:
   obtain the link quality metric that represents the link quality between the first and second wireless devices for the uplink resource of the cellular communication network and the link quality metric that represents the link quality between the first and second wireless devices for the downlink resource of the cellular communication network from one of the first and second wireless devices via the transceiver sub-system; and obtain the link quality metric that represents the link quality between the third wireless device and the second base station via a communication interface between the first and second base stations.

4. The network node of claim 3 wherein in order to select either the uplink resource or the downlink resource of the cellular communication network as the resource for the direct device to device communication link, the processing subsystem is further configured to:
- select the downlink resource of the cellular communication network as the resource of the direct device to device communication link if the link quality between the first and second wireless devices for the downlink resource is better than the link quality between the first and second wireless devices for the uplink resource and the link quality between the third wireless device and the second base station for the downlink resource while the first wireless device transmits to the second wireless device using the downlink resource is better than a predefined threshold level; and
- otherwise, select the uplink resource of the cellular communication network as the resource of the direct device to device communication link.

5. The network node of claim 4 wherein:
- the link quality metric that represents the link quality between the first and second wireless devices for the uplink resource of the cellular communication network is a Signal to Interference plus Noise metric for the uplink resource between the first and second wireless devices;
- the link quality metric that represents the link quality between the first and second wireless devices for the downlink resource of the cellular communication network is a Signal to Interference plus Noise metric for the downlink resource between the first and second wireless devices; and
- the link quality metric that represents the link quality between the third wireless device and the second base station is a Signal to Interference plus Noise metric for the downlink resource between the third wireless device and the second base station while the first wireless device transmits to the second wireless device using the downlink resource.

6. The network node of claim 5 wherein in order to select either the uplink resource or the downlink resource of the cellular communication network as the resource for the direct device to device communication link, the processing subsystem is further configured to:
- select the downlink resource of the cellular communication network as the resource of the direct device to device communication link if a Signal to Interference plus Noise value for the downlink resource between the first and second wireless devices is better than a Signal to Interference plus Noise value for the uplink between the first and second wireless devices and a Signal to Interference plus Noise value for the downlink resource between the third wireless device and the second base station is better than a predefined threshold Signal to Interference plus Noise value; and
- otherwise, select the uplink resource of the cellular communication network as the resource of the direct device to device communication link.

7. The network node of claim 1 wherein:
- the third wireless device is one of a plurality of neighboring wireless devices located in corresponding ones of a plurality of neighboring cells that neighbor the first cell in the cellular communication network;
- each neighboring wireless device of the plurality of neighboring wireless devices being a wireless device that utilizes the uplink resource and the downlink resource in a different one of the plurality of neighboring cells; and
- for each neighboring wireless device, a base station closest to the neighboring wireless device is a neighboring base station that serves a corresponding one of the plurality of neighboring cells.

8. The network node of claim 7 wherein in order to select either the uplink resource or the downlink resource of the cellular communication network as the resource for the direct device to device communication link, the processing subsystem is further configured to:
- select either the uplink resource or the downlink resource of the cellular communication network as the resource for the direct device to device communication link between the first wireless device and the second wireless device located in the first cell of the cellular communication network based on:
  - the link quality metric that represents the link quality between the first and second wireless devices for the uplink resource of the cellular communication network;
  - the link quality metric that represents the link quality between the first and second wireless devices for the downlink resource of the cellular communication network; and
  - for each neighboring wireless device of the plurality of neighboring wireless devices, a link quality metric that represents a link quality between the neighboring wireless device and the neighboring base station that serves the corresponding one of the plurality of neighboring cells for the downlink resource while the first wireless device transmits to the second wireless device using the downlink resource.

9. The network node of claim 8 wherein the network node is a base station that serves the first cell in which the first and second wireless devices are located, and the processing subsystem is further configured to:
- obtain the link quality metric that represents the link quality between the first and second wireless devices for the uplink resource of the cellular communication network and the link quality metric that represents the link quality between the first and second wireless devices for the downlink resource of the cellular communication network from one of the first and second wireless devices via the transceiver sub-system; and
- for each neighboring wireless device of the plurality of neighboring wireless devices, obtain the link quality metric that represents the link quality between the neighboring wireless device and the neighboring base station that serves the corresponding one of the plurality of neighboring cells via a communication interface between the first base station and the base station.

10. The network node of claim 9 wherein in order to select either the uplink resource or the downlink resource of the cellular communication network as the resource for the direct device to device communication link, the processing subsystem is further configured to:
- select the downlink resource of the cellular communication network as the resource of the direct device to device communication link if the link quality between the first and second wireless devices for the downlink resource is better than the link quality between the first and second wireless devices for the uplink resource and, for each neighboring wireless device of the plurality of neighboring wireless devices, the link quality between the neighboring wireless device and the neighboring base station that serves the corresponding one of the plurality of neighboring cells for the downlink resource while the first wireless device transmits to the second wireless device using the downlink resource is better than a predefined threshold level; and otherwise, select the uplink resource of the cellular communication network as the resource of the direct device to device communication link.

11. The network node of claim 9 wherein in order to select either the uplink resource or the downlink resource of the cellular communication network as the resource for the direct device to device communication link, the processing sub-system is further configured to:

identify a worst-case link quality from among the link qualities between the plurality of neighboring wireless devices and the neighboring base stations of the corresponding plurality of neighboring cells;

select the downlink resource of the cellular communication network as the resource of the direct device to device communication link if the link quality between the first and second wireless devices for the downlink resource is better than the link quality between the first and second wireless devices for the uplink resource and the worst-case link quality is better than a predefined threshold level; and otherwise, select the uplink resource of the cellular communication network as the resource of the direct device to device communication link.

12. The network node of claim 1 wherein:

the third wireless device is one of a plurality of neighboring wireless devices located in corresponding ones of a plurality of neighboring cells that neighbor the first cell in the cellular communication network and an intra-cell wireless device located in the first cell of the cellular communication network;

each neighboring wireless device of the plurality of neighboring wireless devices being a wireless device that utilizes the uplink resource and the downlink resource in a different one of the plurality of neighboring cells, and the intra-cell wireless device being a wireless device that utilizes the uplink resource and the downlink resource in the first cell; and for each neighboring wireless device, a base station closest to the neighboring wireless device is a neighboring base station that serves the corresponding one of the plurality of neighboring cells.

13. The network node of claim 12 wherein in order to select either the uplink resource or the downlink resource of the cellular communication network as the resource for the direct device to device communication link, the processing sub-system is further configured to:

select either the uplink resource or the downlink resource of the cellular communication network as the resource for the direct device to device communication link between the first wireless device and the second wireless device located in the first cell of the cellular communication network based on:

the link quality metric that represents the link quality between the first and second wireless devices for the uplink resource of the cellular communication network;

the link quality metric that represents the link quality between the first and second wireless devices for the downlink resource of the cellular communication network;

for each neighboring wireless device of the plurality of neighboring wireless devices, a link quality metric that represents a link quality between the neighboring wireless device and the neighboring base station that serves the corresponding one of the plurality of neighboring cells for the downlink resource while the first wireless device transmits to the second wireless device using the downlink resource; and a link quality metric that represents a link quality between the intra-cell wireless device and the first base station for the downlink resource while the first wireless device transmits to the second wireless device using the downlink resource.

14. The network node of claim 13 wherein the network node is a base station that serves the first cell in which the first and second wireless devices are located, and the processing sub-system is further configured to:

obtain the link quality metric that represents the link quality between the first and second wireless devices for the uplink resource of the cellular communication network and the link quality metric that represents the link quality between the first and second wireless devices for the downlink resource of the cellular communication network from one of the first and second wireless devices via the transceiver sub-system;

for each neighboring wireless device of the plurality of neighboring wireless devices, obtain the link quality metric that represents the link quality between the neighboring wireless device and the neighboring base station that serves the corresponding one of the plurality of neighboring cells via a communication interface between the first base station and the base station; and obtain the link quality metric that represents the link quality between the intra-cell wireless device and the first base station via the transceiver sub-system.

15. The network node of claim 14 wherein in order to select either the uplink resource or the downlink resource of the cellular communication network as the resource for the direct device to device communication link, the processing sub-system is further configured to:

select the downlink resource of the cellular communication network as the resource of the direct device to device communication link if:

the link quality between the first and second wireless devices for the downlink resource is better than the link quality between the first and second wireless devices for the uplink resource;

for each neighboring wireless device of the plurality of neighboring wireless devices, the link quality between the neighboring wireless device and the neighboring base station that serves the corresponding one of the plurality of neighboring cells for the downlink resource while the first wireless device transmits to the second wireless device using the downlink resource is better than a predefined threshold level; and the link quality between the intra-cell wireless device and the first base station for the downlink resource while the first wireless device transmits to the second wireless device using the downlink resource is better than the predefined threshold level; and otherwise, select the uplink resource of the cellular communication network as the resource of the direct device to device communication link.

16. The network node of claim 14 wherein in order to select either the uplink resource or the downlink resource of the cellular communication network as the resource for the direct device to device communication link, the processing subsystem is further configured to:
- identify a worst-case link quality from among the link qualities between the plurality of neighboring wireless devices and the neighboring base stations of the corresponding plurality of neighboring cells and the link quality between the intra-cell wireless device and the first base station; and
- select the downlink resource of the cellular communication network as the resource of the direct device to device communication link if the link quality between the first and second wireless devices for the downlink resource is better than the link quality between the first and second wireless devices for the uplink resource and the worst-case link quality is better than a predefined threshold level; and
- otherwise, select the uplink resource of the cellular communication network as the resource of the direct device to device communication link.

17. The network node of claim 1 wherein the network node is a base station that serves the first cell of the cellular communication network.

18. A method of operation of a network node configured to select a resource for a direct device to device communication link between a first wireless device and a second wireless device in a cellular communication network, comprising:
- selecting either an uplink resource or a downlink resource of the cellular communication network as a resource for the direct device to device communication link between the first wireless device and the second wireless device located in a first cell of the cellular communication network served by a first base station based on:
  - a link quality metric that represents a link quality between the first and second wireless devices for the uplink resource of the cellular communication network;
  - a link quality metric that represents a link quality between the first and second wireless devices for the downlink resource of the cellular communication network; and
  - a link quality metric that represents a link quality between a third wireless device and a base station for the downlink resource that occurs when the first wireless device transmits to the second wireless device using the downlink resource; and
- informing the first and second wireless devices of the resource selected for the direct device to device communication link.

19. The method of claim 18 wherein the third wireless device is located in a second cell that neighbors the first cell in the cellular communication network, and the base station is a second base station that serves the second cell.

20. The method of claim 19 wherein the network node is the first base station that serves the first cell in which the first and second wireless devices are located, and the method further comprises:
- obtaining the link quality metric that represents the link quality between the first and second wireless devices for the uplink resource of the cellular communication network and the link quality metric that represents the link quality between the first and second wireless devices for the downlink resource of the cellular communication network from one of the first and second wireless devices via a transceiver sub-system of the first base station; and
- obtaining the link quality metric that represents the link quality between the third wireless device and the second base station via a communication interface between the first and second base stations.

21. The method of claim 20 wherein selecting either the uplink resource or the downlink resource of the cellular communication network as the resource for the direct device to device communication link comprises:
- selecting the downlink resource of the cellular communication network as the resource of the direct device to device communication link if the link quality between the first and second wireless devices for the downlink resource is better than the link quality between the first and second wireless devices for the uplink resource and the link quality between the third wireless device and the second base station for the downlink resource while the first wireless device transmits to the second wireless device using the downlink resource is better than a predefined threshold level; and
- otherwise, selecting the uplink resource of the cellular communication network as the resource of the direct device to device communication link.

22. The method of claim 18 wherein:
- the third wireless device is one of a plurality of neighboring wireless devices located in corresponding ones of a plurality of neighboring cells that neighbor the first cell in the cellular communication network;
- each neighboring wireless device of the plurality of neighboring wireless devices being a wireless device that utilizes the uplink resource and the downlink resource in a different one of the plurality of neighboring cells; and
- for each neighboring wireless device, a base station closest to the neighboring wireless device is a neighboring base station that serves the corresponding one of the plurality of neighboring cells.

23. The method of claim 22 wherein selecting either the uplink resource or the downlink resource of the cellular communication network as the resource for the direct device to device communication link comprises:
- selecting either the uplink resource or the downlink resource of the cellular communication network as the resource for the direct device to device communication link between the first wireless device and the second wireless device located in the first cell of the cellular communication network based on:
  - the link quality metric that represents the link quality between the first and second wireless devices for the uplink resource of the cellular communication network;
  - the link quality metric that represents the link quality between the first and second wireless devices for the downlink resource of the cellular communication network; and
  - for each neighboring wireless device of the plurality of neighboring wireless devices, a link quality metric that represents a link quality between the neighboring wireless device and the neighboring base station that serves the corresponding one of the plurality of neighboring cells for the downlink resource while the first wireless device transmits to the second wireless device using the downlink resource.

24. The method of claim 23 wherein the network node is the first base station that serves the first cell in which the first and second wireless devices are located, and the method further comprises:
- obtaining the link quality metric that represents the link quality between the first and second wireless devices for the uplink resource of the cellular communication network and the link quality metric that represents the link quality between the first and second wireless devices for the downlink resource of the cellular communication network from one of the first and second wireless devices; and for each neighboring wireless device of the plurality of neighboring wireless devices, obtaining the link quality metric that represents the link quality between the neighboring wireless device and the neighboring base station that serves the corresponding one of the plurality of neighboring cells.

25. The method of claim 24 wherein selecting either the uplink resource or the downlink resource of the cellular communication network as the resource for the direct device to device communication link comprises:

selecting the downlink resource of the cellular communication network as the resource of the direct device to device communication link if the link quality between the first and second wireless devices for the downlink resource is better than the link quality between the first and second wireless devices for the uplink resource and, for each neighboring wireless device of the plurality of neighboring wireless devices, the link quality between the neighboring wireless device and the neighboring base station that serves the corresponding one of the plurality of neighboring cells for the downlink resource while the first wireless device transmits to the second wireless device using the downlink resource is better than a predefined threshold level; and otherwise, selecting the uplink resource of the cellular communication network as the resource of the direct device to device communication link.

26. The method of claim 24 wherein selecting either the uplink resource or the downlink resource of the cellular communication network as the resource for the direct device to device communication link comprises:

identifying a worst-case link quality from among the link qualities between the plurality of neighboring wireless devices and the neighboring base stations of the corresponding plurality of neighboring cells; and selecting the downlink resource of the cellular communication network as the resource of the direct device to device communication link if the link quality between the first and second wireless devices for the downlink resource is better than the link quality between the first and second wireless devices for the uplink resource and the worst-case link quality is better than a predefined threshold level; and otherwise, selecting the uplink resource of the cellular communication network as the resource of the direct device to device communication link.

27. The method of claim 18 wherein:

the third wireless device is one of a plurality of neighboring wireless devices located in a corresponding plurality of neighboring cells that neighbor the first cell in the cellular communication network and an intra-cell wireless device located in the first cell of the cellular communication network;

each neighboring wireless device of the plurality of neighboring wireless devices being a wireless device that utilizes the uplink resource and the downlink resource in a different one of the plurality of neighboring cells, and the intra-cell wireless device being a wireless device that utilizes the uplink resource and the downlink resource in the first cell; and for each neighboring wireless device, a base station closest to the neighboring wireless device is a neighboring base station that serves the corresponding one of the plurality of neighboring cells.

28. The method of claim 27 wherein selecting either the uplink resource or the downlink resource of the cellular communication network as the resource for the direct device to device communication link comprising:

selecting either the uplink resource or the downlink resource of the cellular communication network as the resource for the direct device to device communication link between the first wireless device and the second wireless device located in the first cell of the cellular communication network based on:

the link quality metric that represents the link quality between the first and second wireless devices for the uplink resource of the cellular communication network;

the link quality metric that represents the link quality between the first and second wireless devices for the downlink resource of the cellular communication network;

for each neighboring wireless device of the plurality of neighboring wireless devices, a link quality metric that represents a link quality between the neighboring wireless device and the neighboring base station that serves the corresponding one of the plurality of neighboring cells for the downlink resource while the first wireless device transmits to the second wireless device using the downlink resource; and a link quality metric that represents a link quality between the intra-cell wireless device and the first base station for the downlink resource while the first wireless device transmits to the second wireless device using the downlink resource.

29. The method of claim 28 wherein the network node is the first base station that serves the first cell in which the first and second wireless devices are located, and the method further comprises:

obtaining the link quality metric that represents the link quality between the first and second wireless devices for the uplink resource of the cellular communication network and the link quality metric that represents the link quality between the first and second wireless devices for the downlink resource of the cellular communication network from one of the first and second wireless devices;

for each neighboring wireless device of the plurality of neighboring wireless devices, obtaining the link quality metric that represents the link quality between the neighboring wireless device and the neighboring base station that serves the corresponding one of the plurality of neighboring cells; and obtaining the link quality metric that represents the link quality between the intra-cell wireless device and the first base station via the transceiver sub-system.

30. The method of claim 29 wherein selecting either the uplink resource or the downlink resource of the cellular communication network as the resource for the direct device to device communication link comprises:

selecting the downlink resource of the cellular communication link if:

the link quality between the first and second wireless devices for the downlink resource is better than the link quality between the first and second wireless devices for the uplink resource;

for each neighboring wireless device of the plurality of neighboring wireless devices, the link quality between the neighboring wireless device and the neighboring base station that serves the corresponding one of the plurality of neighboring cells for the downlink resource while the first wireless device transmits to the second wireless device using the downlink resource is better than a predefined threshold level; and the link quality between the intra-cell wireless device and the first base station for the downlink resource while the first wireless device transmits to the second wireless device using the downlink resource is better than the predefined threshold level; and otherwise, select the uplink resource of the cellular communication network as the resource of the direct device to device communication link.

31. The method of claim 29 wherein selecting either the uplink resource or the downlink resource of the cellular communication network as the resource for the direct device to device communication link comprises:

selecting a worst-case link quality from among the link qualities between the plurality of neighboring wireless devices and the neighboring base stations of the corresponding plurality of neighboring cells and the link quality between the intra-cell wireless device and the first base station; and selecting the downlink resource of the cellular communication network as the resource of the direct device to device communication link if the link quality between the first and second wireless devices for the downlink resource is better than the link quality between the first and second wireless devices for the uplink resource and the worst-case link quality is better than a predefined threshold level; and otherwise, selecting the uplink resource of the cellular communication network as the resource of the direct device to device communication link.

* * * * *

UNITED STATES PATENT AND TRADEMARK OFFICE
CERTIFICATE OF CORRECTION

| | | Page 1 of 1 |
|---|---|---|
| PATENT NO. | : 8,913,530 B2 | |
| APPLICATION NO. | : 13/465303 | |
| DATED | : December 16, 2014 | |
| INVENTOR(S) | : Dimou et al. | |

It is certified that error appears in the above-identified patent and that said Letters Patent is hereby corrected as shown below:

On the Title Page, in Item (75), under "Inventors", in Column 1, Line 3, delete "Hasselby" and insert -- Hässelby --, therefor.

In the Specification

In Column 3, Line 43, delete "DRAWING" and insert -- DRAWINGS/ --, therefor.

In Column 10, Line 11, delete "Noise" and insert -- Noise Ratio --, therefor.

Signed and Sealed this
Twenty-ninth Day of September, 2015

Michelle K. Lee
*Director of the United States Patent and Trademark Office*